(12) United States Patent (10) Patent No.: US 9,398,307 B2
Segall (45) Date of Patent: Jul. 19, 2016

(54) VIDEO DECODER FOR TILES

(75) Inventor: Christopher A. Segall, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 769 days.

(21) Appl. No.: 13/355,139

(22) Filed: Jan. 20, 2012

(65) Prior Publication Data

US 2013/0016786 A1 Jan. 17, 2013

Related U.S. Application Data

(63) Continuation-in-part of application No. 13/180,419, filed on Jul. 11, 2011, now Pat. No. 8,767,824.

(51) Int. Cl.
*H04N 7/26* (2006.01)
*H04N 7/12* (2006.01)
*H04N 19/436* (2014.01)
*H04N 19/70* (2014.01)
*H04N 19/13* (2014.01)
*H04N 19/174* (2014.01)

(52) U.S. Cl.
CPC ............. *H04N 19/436* (2014.11); *H04N 19/13* (2014.11); *H04N 19/174* (2014.11); *H04N 19/70* (2014.11)

(58) Field of Classification Search
None
See application file for complete search history.

(56) References Cited

U.S. PATENT DOCUMENTS

| 2003/0156652 | A1* | 8/2003 | Wise et al. | 375/240.26 |
| 2006/0017591 | A1* | 1/2006 | Bossen | 341/50 |
| 2009/0323809 | A1* | 12/2009 | Raveendran | 375/240.16 |
| 2012/0163453 | A1* | 6/2012 | Horowitz | 375/240.12 |
| 2012/0183074 | A1* | 7/2012 | Fuldseth | 375/240.24 |
| 2012/0243614 | A1* | 9/2012 | Hong et al. | 375/240.24 |

FOREIGN PATENT DOCUMENTS

CN 102055963 A 5/2011

OTHER PUBLICATIONS

Wiegand et al., "WD1: Working draft 1 of High-Efficiency Video Coding," JCT-VC of ITU-T SG16 WP3 and ISO/IEC JTC1/SC29/WG11, 3rd Meeting: Guangzhou, CN, Oct. 7-15, 2010, 50 pgs., Part1.
Wiegand et al., "WD1: Working draft 1 of High-Efficiency Video Coding," JCT-VC of ITU-T SG16 WP3 and ISO/IEC JTC1/SC29/WG11, 3rd Meeting: Guangzhou, CN, Oct. 7-15, 2010, 50 pgs., Part2.
Wiegand et al., "WD1: Working draft 1 of High-Efficiency Video Coding," JCT-VC of ITU-T SG16 WP3 and ISO/IEC JTC1/SC29/WG11, 3rd Meeting: Guangzhou, CN, Oct. 7-15, 2010, 37 pgs., Part3.
Misra et al., "Tiles for parallel decoding," JCT-VC of ITU-T SG16 WP3 and ISO/IEC JTC1/SC29/WG11, JCTVC-E412, 5th Meeting: Geneva, CH, Mar. 16-23, 2011, 5 pgs.

(Continued)

*Primary Examiner* — Frederick Bailey
(74) *Attorney, Agent, or Firm* — Keating & Bennett, LLP

(57) ABSTRACT

A system for decoding a video bitstream includes receiving a frame of the video that includes at least one slice and at least one tile and where each of the at least one slice and the at least one tile are not all aligned with one another. Each of the at least one tile is characterized that it is decoded independently of the other the at least one tile including intra-prediction information, motion information. The system receives a set of data from a set of largest coding unit of at least two of the tiles and decoding the largest coding units in a selected manner depending upon a flag in the bitstream. The flag indicates that the decoding is to be performed in a raster scan order within a tile or the decoding is to be performed in a raster scan order across at least two tiles.

2 Claims, 27 Drawing Sheets

(56) References Cited

OTHER PUBLICATIONS

Fuldseth, "Tiles," JCT-VC of ITU-T SG16 WP3 and ISO/IEC JTC1/SC29/WG11, JCTVC-E408, 5th Meeting: Geneva, CH, Mar. 16-23, 2011, 14 pgs.

Misra et al., "New results for parallel decoding for Tiles," JCT-VC of ITU-T SG16 WP3 and ISO/IEC JTC1/SC29/WG11, JCTVC-F594, 6th Meeting: Torino, IT, Jul. 14-22, 2011, 6 pgs.

Bross et al., "WD4: Working Draft 4 of High-Efficiency Video Coding," JCT-VC of ITU-T SG16 WP3 and ISO/IEC JTC1/SC29/WG11, JCTVC-F803, 6th Meeting: Torino, IT, Jul. 14-22, 2011, pp. 1, v., vi, 29-30, 34-35, 59-62.

International Search Report, dated Oct. 9, 2012, for PCT International Application No. PCT/JP2012/068041, filed Jul. 10, 2012 by Sharp Kabushiki Kaisha, 5 pgs.

Segall; "Video Decoder for Parallelization Including Slices"; U.S. Appl. No. 13/045,425, filed Mar. 10, 2011.

Segall; "Video Decoder Parallelization Including a Bitstream Signal"; U.S. Appl. No. 13/045,442, filed Mar. 10, 2011.

Segall et al.; "Video Decoder for Slices"; U.S. Appl. No. 13/194,677, filed Jul. 29, 2011.

Misra et al.; "Video Decoder Parallelization for Tiles"; U.S. Appl. No. 13/180,419, filed Jul. 11, 2011.

Misra et al.; "Video Decoder Parallelization for Tiles"; U.S. Appl. No. 14/279,726, filed May 16, 2014.

Misra et al.; "Video Decoder Parallelization for Tiles"; U.S. Appl. No. 14/279,741, filed May 16, 2014.

Misra et al.; "Video Decoder Parallelization for Tiles"; U.S. Appl. No. 14/279,745, filed May 16, 2014.

Misra, K. et al., "Entropy Slices for Parallel Entropy Coding", JCT-VC of ITU-T SG16 WP3 and ISO/IEC JTC1/SC29/WG11, 3rd Meeting, Oct. 7-15, 2010, 6 pages.

Horowitz, M. et al., "Generalized Slices", JCT-VC of ITU-T SG16 WP3 and ISO/IEC JTC1/SC29/WG11, 4th Meeting, Jan. 20-28, 2011, 7 pages.

Misra, K. et al., "Periodic Initialization for Wavefront Coding Functionality", JCT-VC of ITU-T SG16 WP3 and ISO/IEC JTC1/SC29/WG11, 4th Meeting, Jan. 20-28, 2011, 5 pages.

* cited by examiner

| slice_header( ) { | C | Descriptor |
|---|---|---|
|   first_lctb_in_slice | 2 | ue(v) |
|   lightweight_slice_flag | 2 | u(1) |
|   if(! lightweight_slice_flag) { | | |
|     slice_type | 2 | ue(v) |
|     pic_parameter_set_id | 2 | ue(v) |
|     Frame_num | 2 | u(v) |
|     if( IdrPicFlag ) | | |
|       idr_pic_id | 2 | ue(v) |
|     pic_order_cnt_lsb | 2 | u(v) |
|     if( slice_type == P \|\| slice_type == B ) { | | |
|       Num_ref_idx_active_override_flag | 2 | u(1) |
|       if( num_ref_idx_active_override_flag) { | | |
|         num_ref_idx_l0_active_minus1 | 2 | ue(v) |
|         If( slice_type == B ) | | |
|           num_ref_idx_l1_active_minus1 | 2 | ue(v) |
|       } | | |
|     } | | |
|     if( nal_ref_idc != 0 ) | | |
|       Dec_ref_pic_marking() | 2 | |
|     if( entropy_coding_mode_flag && slice_type != I ) | | |
|       cabac_init_idc | 2 | ue(v) |
|     slice_qp_delta | 2 | se(v) |
|     alf_param() | | |
|     if( slice_type == P \|\| slice_type == B ) { | | |
|       mc_interpolation_idc | 2 | ue(v) |
|       mv_competition_flag | 2 | u(1) |
|       if ( mv_competition_flag) { | | |
|         mv_competition_temporal_flag | 2 | u(1) |
|       } | | |
|     } | | |
|     if( slice_type == B && mv_competition_flag) | | |
|       collocated_from_l0_flag | 2 | u(1) |
|   } | | |
|   else { | | |
|     if( entropy_coding_mode_flag && slice_type != I) | | |
|       cabac_init_idc | 2 | ue(v) |
|   } | | |

FIG. 12A

| slice_header( ) { | C | Descriptor |
|---|---|---|
|   first_lctb_in_slice | 2 | ue(v) |
|   lightweight_slice_flag | 2 | u(1) |
|   if(! lightweight_slice_flag) { | | |
|     slice_type | 2 | ue(v) |
|     pic_parameter_set_id | 2 | ue(v) |
|     Frame_num | 2 | u(v) |
|     if( IdrPicFlag ) | | |
|       idr_pic_id | 2 | ue(v) |
|     pic_order_cnt_lsb | 2 | u(v) |
|     if( slice_type == P || slice_type == B ) { | | |
|       Num_ref_idx_active_override_flag | 2 | u(1) |
|       if( num_ref_idx_active_override_flag ) { | | |
|         num_ref_idx_l0_active_minus1 | 2 | ue(v) |
|         If( slice_type == B ) | | |
|           num_ref_idx_l1_active_minus1 | 2 | ue(v) |
|       } | | |
|     } | | |
|     if( nal_ref_idc != 0 ) | | |
|       Dec_ref_pic_marking() | 2 | |
|     if( entropy_coding_mode_flag && slice_type != I) | | |
|       cabac_init_idc | 2 | ue(v) |
|     slice_qp_delta | 2 | se(v) |
|     alf_param() | | |
|     if( slice_type == P || slice_type == B ) { | | |
|       mc_interpolation_idc | 2 | ue(v) |
|       mv_competition_flag | 2 | u(1) |
|       if( mv_competition_flag) { | | |
|         mv_competition_temporal_flag | 2 | u(1) |
|       } | | |
|     } | | |
|     if( slice_type == B && mv_competition_flag) | | |
|       collocated_from_l0_flag | 2 | u(1) |
|   } | | |
|   else { | | |
|     if(entropy_coding_mode_flag && slice_type != I) | | |
|       cabac_init_idc | 2 | ue(v) |
|     slice_qp_delta | | |
|   } | | |

FIG. 12B

|     | Tile A |     | Tile B |     |     | Tile C |     |     |
|-----|-----|-----|-----|-----|-----|-----|-----|-----|
| 1 | 2 | 3 | 10 | 11 | 12 | 19 | 20 | 21 |
| 4 | 5 | 6 | 13 | 14 | 15 | 22 | 23 | 24 |
| 7 | 8 | 9 | 16 | 17 | 18 | 25 | 26 | 27 |
| Tile D |  |  | Tile E |  |  | Tile F |  |  |
| Tile G |  |  | Tile H |  |  | Tile I |  |  |

FIG. 19

VIDEO DECODER FOR TILES

CROSS-REFERENCE TO RELATED APPLICATIONS

This application is a continuation-in-part of U.S. patent application Ser. No. 13/180,419, filed Jul. 11, 2011.

BACKGROUND OF THE INVENTION

The present invention relates to video encoding and decoding.

Digital video is typically represented as a series of images or frames, each of which contains an array of pixels. Each pixel includes information, such as intensity and/or color information. In many cases, each pixel is represented as a set of three colors, each of which is defined by eight bit color values.

Video-coding techniques, for example H.264/MPEG-4 AVC (H.264/AVC), typically provide higher coding efficiency at the expense of increasing complexity. Increasing image quality requirements and increasing image resolution requirements for video coding techniques also increase the coding complexity. Video decoders that are suitable for parallel decoding may improve the speed of the decoding process and reduce memory requirements; video encoders that are suitable for parallel encoding may improve the speed of the encoding process and reduce memory requirements.

H.264/MPEG-4 AVC [Joint Video Team of ITU-T VCEG and ISO/IEC MPEG, "H.264: Advanced video coding for generic audiovisual services," ITU-T Rec. H.264 and ISO/IEC 14496-10 (MPEG4—Part 10), November 2007], and similarly the JCT-VC, ["Draft Test Model Under Consideration", JCTVC-A205, JCT-VC Meeting, Dresden, April 2010 (JCT-VC)], both of which are incorporated by reference herein in their entirety, are video codec (encoder/decoder) specifications that use macroblock prediction followed by residual coding to reduce temporal and spatial redundancy in a video sequence for compression efficiency.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 7 illustrates a frame with a slice and 9 tiles.
FIG. 8 illustrates a frame with three slices and 3 tiles.
FIGS. 12A and 12B illustrates exemplary syntax.
FIG. 19 another decoding order for a frame including tiles and largest coding units.

DETAILED DESCRIPTION OF PREFERRED EMBODIMENT

While any video coder/decoder (codec) that uses entropy encoding/decoding may be accommodated by embodiments described herein, exemplary embodiments are described in relation to an H.264/AVC encoder and an H.264/AVC decoder merely for purposes of illustration. Many video coding techniques are based on a block-based hybrid video-coding approach, wherein the source-coding technique is a hybrid of inter-picture, also considered inter-frame, prediction, intra-picture, also considered intra-frame, prediction and transform coding of a prediction residual. Inter-frame prediction may exploit temporal redundancies, and intra-frame and transform coding of the prediction residual may exploit spatial redundancies.

Figure 1:
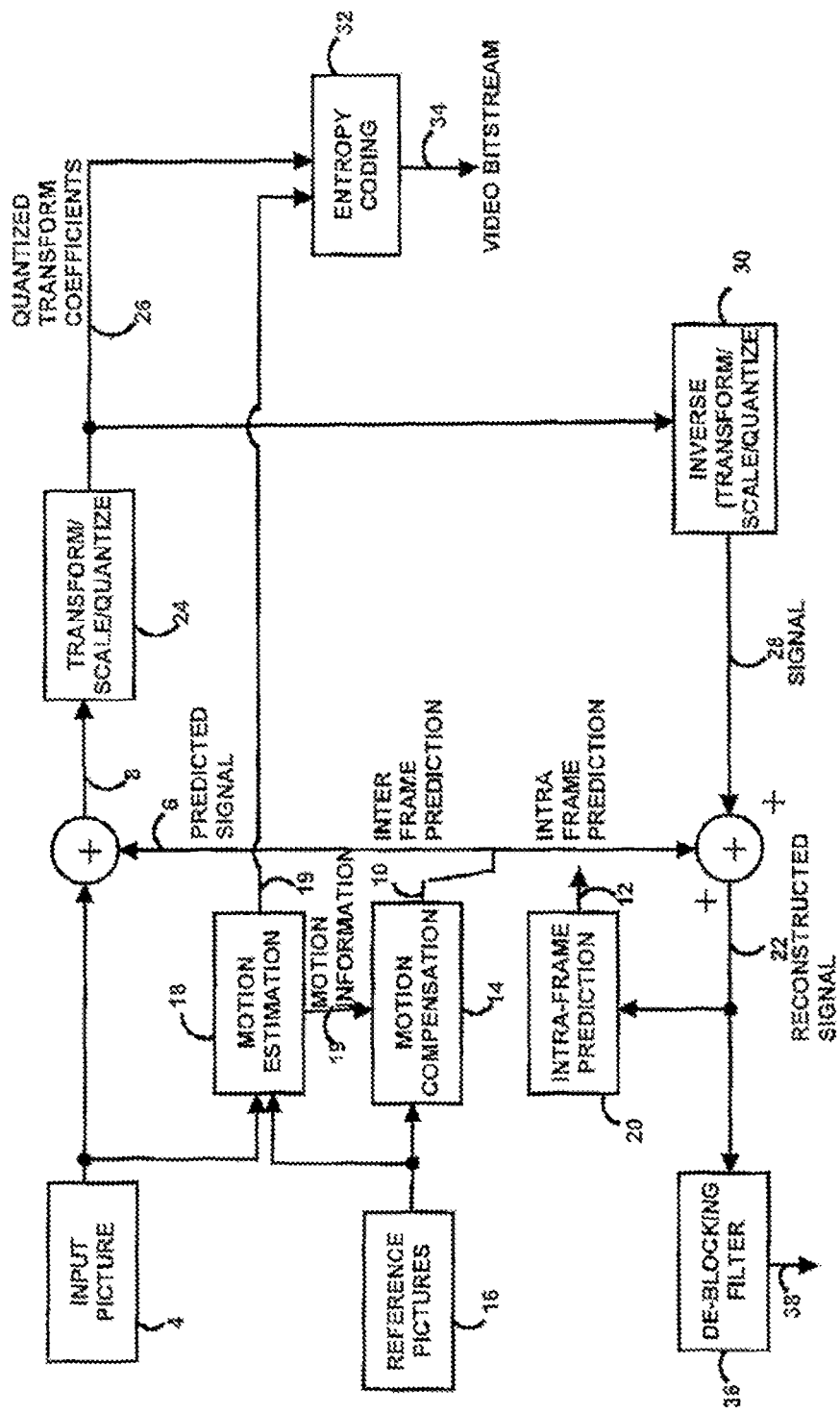
FIG. 1 illustrates a H.264/AVC video encoder.

FIG. 1 illustrates an exemplary H.264/AVC video encoder 2. An input picture 4, also considered a frame, may be presented for encoding. A predicted signal 6 and a residual signal 8 may be produced, wherein the predicted signal 6 may be based on either an inter-frame prediction 10 or an intra-frame prediction 12. The inter-frame prediction 10 may be determined by motion compensating 14 one or more stored, reference pictures 16, also considered reference frames, using motion information 19 determined by a motion estimation 18 process between the input frame 4 and the reference frames 16. The intra-frame prediction 12 may be determined 20 using a decoded signal 22. The residual signal 8 may be determined by subtracting the input frame 4 from the predicted signal 6. The residual signal 8 is transformed, scaled and quantized 24, thereby producing quantized, transform coefficients 26. The decoded signal 22 may be generated by adding the predicted signal 6 to a signal 28 generated by inverse transforming, scaling and inverse quantizing 30 the quantized, transform coefficients 26. The motion information 19 and the quantized, transform coefficients 26 may be entropy coded 32 and written to the compressed-video bitstream 34. An output image region 38, for example a portion of the reference frame, may be generated at the encoder 2 by filtering 36 the reconstructed, pre-filtered signal 22. This output frame may be used as a reference frame for the encoding of subsequent input pictures.

Figure 2:
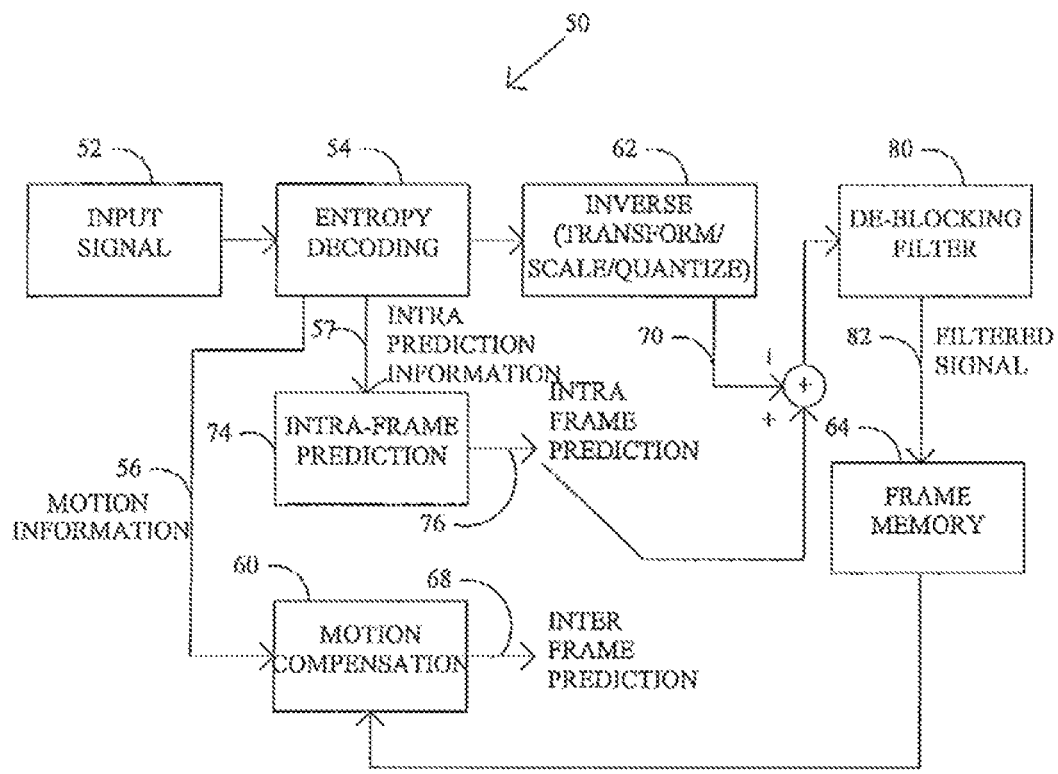
FIG. 2 illustrates a H.264/AVC video decoder.

FIG. 2 illustrates an exemplary H.264/AVC video decoder 50. An input signal 52, also considered a bitstream, may be presented for decoding. Received symbols may be entropy decoded 54, thereby producing motion information 56, intra-prediction information 57, and quantized, scaled, transform coefficients 58. The motion information 56 may be combined 60 with a portion of one or more reference frames 62 which may reside in frame memory 64, and an inter-frame prediction 68 may be generated. The quantized, scaled, transform coefficients 58 may be inverse quantized, scaled and inverse transformed, thereby producing a decoded residual signal 70. The residual signal 70 may be added to a prediction signal: either the inter-frame prediction signal 68 or an intra-frame prediction signal 76. The intra-frame prediction information may be combined 74 with previously decoded information in the current frame 72, and an intra-frame prediction 74 may be generated. The combined signal 72 may be filtered 80 and the filtered signal 82 may be written to frame memory 64.

In H.264/AVC, an input picture may be partitioned into fixed-size macroblocks, wherein each macroblock covers a rectangular picture area of 16×16 samples of the luma component and 8×8 samples of each of the two chroma components. The decoding process of the H.264/AVC standard is specified for processing units which are macroblocks. The entropy decoder 54 parses the syntax elements of the compressed-video bitstream 52 and de-multiplexes them. H.264/AVC specifies two alternative methods of entropy decoding: a low-complexity technique that is based on the usage of context-adaptively switched sets of variable length codes, referred to as CAVLC, and the computationally more demanding technique of context-based adaptively binary arithmetic coding, referred to as CABAC. In both such entropy decoding techniques, decoding of a current symbol may rely on previously, correctly decoded symbols and adaptively updated context models. In addition, different data information, for example, prediction data information, residual data information and different color planes, may be multiplexed together. De-multiplexing may wait until elements are entropy decoded.

After entropy decoding, a macroblock may be reconstructed by obtaining: the residual signal through inverse quantization and the inverse transform, and the prediction signal, either the intra-frame prediction signal or the inter-frame prediction signal. Blocking distortion may be reduced by applying a de-blocking filter to decoded macroblocks. Typically, such subsequent processing begins after the input signal is entropy decoded, thereby resulting in entropy decoding as a potential bottleneck in decoding. Similarly, in codecs in which alternative prediction mechanisms are used, for example, inter-layer prediction in H.264/AVC or inter-layer prediction in other scalable codecs, entropy decoding may be requisite prior to processing at the decoder, thereby making entropy decoding a potential bottleneck.

An input picture comprising a plurality of macroblocks may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and macroblock reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 3:
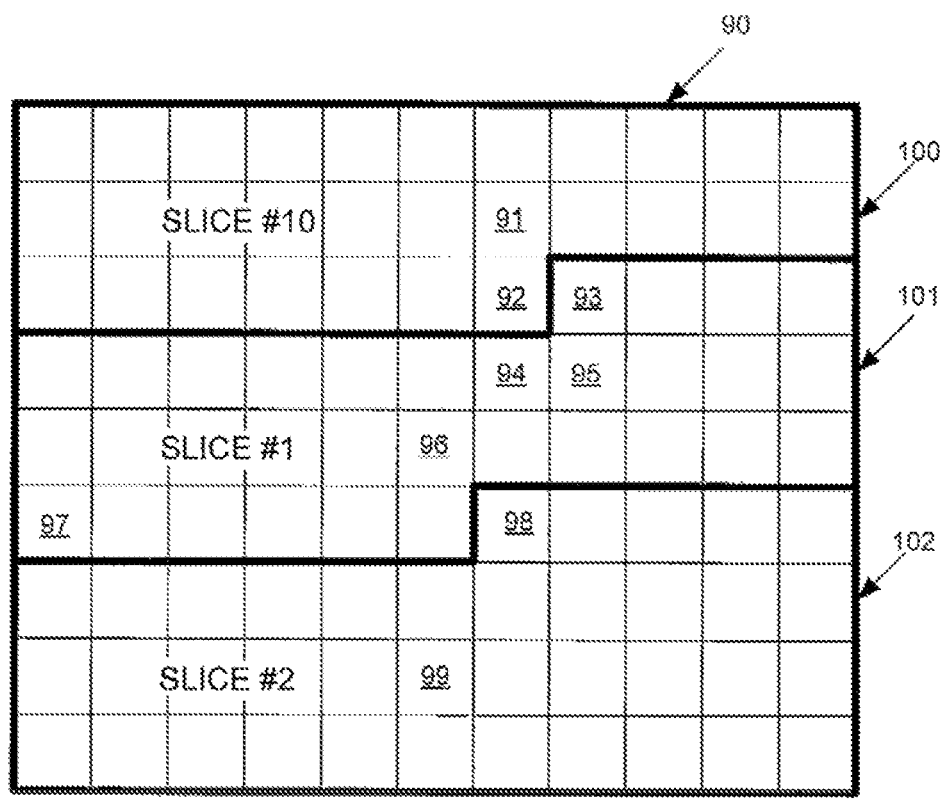
FIG. 3 illustrates an exemplary slice structure.

FIG. 3 illustrates an exemplary video picture 90 comprising eleven macroblocks in the horizontal direction and nine macroblocks in the vertical direction (nine exemplary macroblocks labeled 91-99). FIG. 3 illustrates three exemplary slices: a first slice denoted "SLICE #0" 100, a second slice denoted "SLICE #1" 101 and a third slice denoted "SLICE #2" 102. An H.264/AVC decoder may decode and reconstruct the three slices 100, 101, 102 in parallel. Each of the slides may be transmitted in scan line order in a sequential manner. At the beginning of the decoding/reconstruction process for each slice, context models are initialized or reset and macroblocks in other slices are marked as unavailable for both entropy decoding and macroblock reconstruction. Thus, for a macroblock, for example, the macroblock labeled 93, in "SLICE #1," macroblocks (for example, macroblocks labeled 91 and 92) in "SLICE #0" may not be used for context model selection or reconstruction. Whereas, for a macroblock, for example, the macroblock labeled 95, in "SLICE #1," other macroblocks (for example, macroblocks labeled 93 and 94) in "SLICE #1" may be used for context model selection or reconstruction. Therefore, entropy decoding and macroblock reconstruction proceeds serially within a slice. Unless slices are defined using a flexible macroblock ordering (FMO), macroblocks within a slice are processed in the order of a raster scan.

Flexible macroblock ordering defines a slice group to modify how a picture is partitioned into slices. The macroblocks in a slice group are defined by a macroblock-to-slice-group map, which is signaled by the content of the picture parameter set and additional information in the slice headers. The macroblock-to-slice-group map consists of a slice-group identification number for each macroblock in the picture. The slice-group identification number specifies to which slice group the associated macroblock belongs. Each slice group may be partitioned into one or more slices, wherein a slice is a sequence of macroblocks within the same slice group that is processed in the order of a raster scan within the set of macroblocks of a particular slice group. Entropy decoding and macroblock reconstruction proceeds serially within a slice group.

Figure 4:
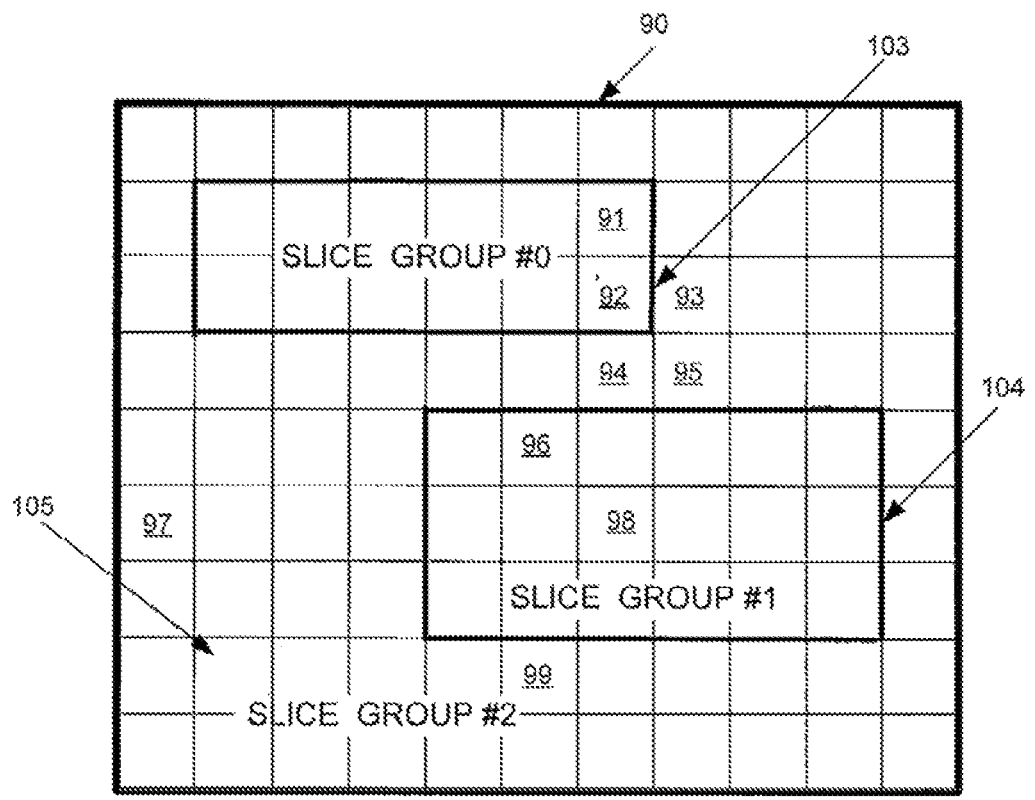
FIG. 4 illustrates another exemplary slice structure.

FIG. 4 depicts an exemplary macroblock allocation into three slice groups: a first slice group denoted "SLICE GROUP #0" 103, a second slice group denoted "SLICE GROUP #1" 104 and a third slice group denoted "SLICE GROUP #2" 105. These slice groups 103, 104, 105 may be associated with two foreground regions and a background region, respectively, in the picture 90.

A picture may be partitioned into one or more reconstruction slices, wherein a reconstruction slice may be self-contained in the respect that values of the samples in the area of the picture that the reconstruction slice represents may be correctly reconstructed without use of data from other reconstruction slices, provided that the references pictures used are identical at the encoder and the decoder. All reconstructed macroblocks within a reconstruction slice may be available in the neighborhood definition for reconstruction.

A reconstruction slice may be partitioned into more than one entropy slice, wherein an entropy slice may be self-contained in the respect that symbol values in the area of the picture that the entropy slice represents may be correctly entropy decoded without the use of data from other entropy slices. The entropy coding state may be reset at the decoding start of each entropy slice. The data in other entropy slices may be marked as unavailable when defining neighborhood availability for entropy decoding. Macroblocks in other entropy slices may not be used in a current block's context model selection. The context models may be updated only within an entropy slice. Accordingly, each entropy decoder associated with an entropy slice may maintain its own set of context models.

Figure 5:
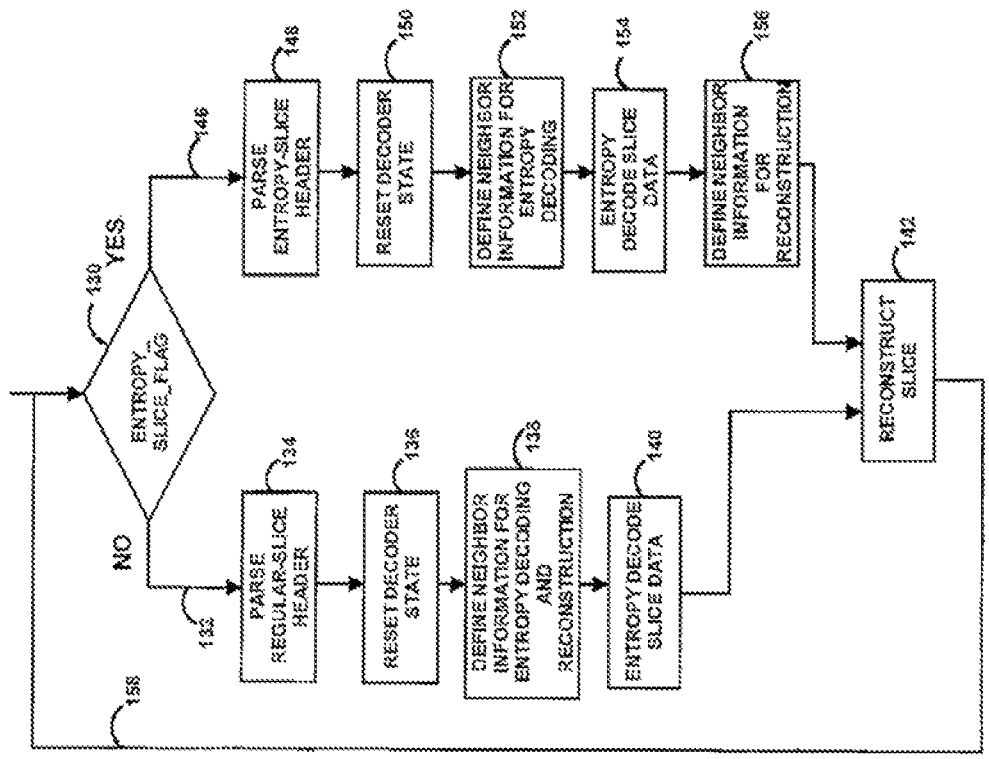
FIG. 5 illustrates reconstruction of an entropy slice.

An encoder may determine whether or not to partition a reconstruction slice into entropy slices, and the encoder may signal the decision in the bitstream. The signal may comprise an entropy-slice flag, which may be denoted "entropy_slice_flag". Referring to FIG. 5, an entropy-slice flag may be examined 130, and if the entropy-slice flag indicates that there are no 132 entropy slices associated with a picture, or a reconstruction slice, then the header may be parsed 134 as a regular slice header. The entropy decoder state may be reset 136, and the neighbor information for the entropy decoding and the reconstruction may be defined 138. The slice data may then be entropy decoded 140, and the slice may be reconstructed 142. If the entropy-slice flag indicates there are 146 entropy slices associated with a picture, or a reconstruction slice, then the header may be parsed 148 as an entropy-slice header. The entropy decoder state may be reset 150, the neighbor information for entropy decoding may be defined 152 and the entropy-slice data may be entropy decoded 154. The neighbor information for reconstruction may then be defined 156, and the slice may be reconstructed 142. After slice reconstruction 142, the next slice, or picture, may be examined 158.

Figure 6:
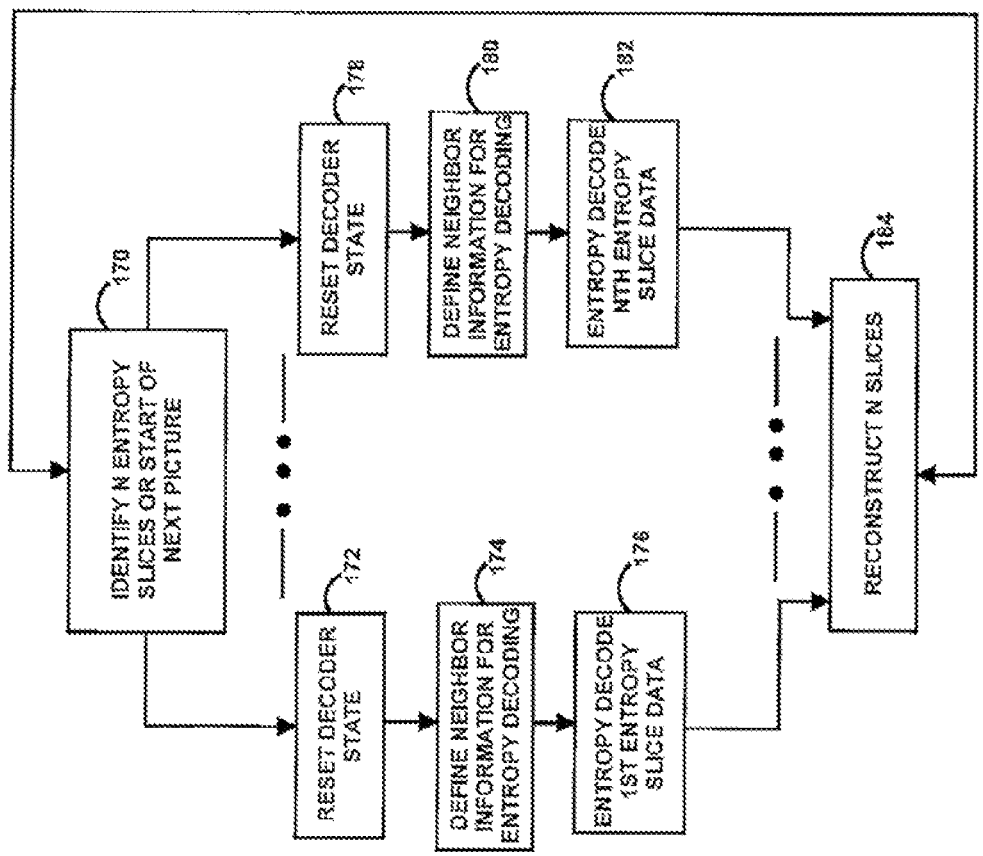
FIG. 6 illustrates parallel reconstruction of an entropy slice.

Referring to FIG. 6, the decoder may be capable of parallel decoding and may define its own degree of parallelism, for example, consider a decoder comprising the capability of decoding N entropy slices in parallel. The decoder may identify 170 N entropy slices. If fewer than N entropy slices are available in the current picture, or reconstruction slice, the decoder may decode entropy slices from subsequent pictures, or reconstruction slices, if they are available. Alternatively, the decoder may wait until the current picture, or reconstruction slice, is completely processed before decoding portions of a subsequent picture, or reconstruction slice. After identifying 170 up to N entropy slices, each of the identified entropy slices may be independently entropy decoded. A first entropy slice may be decoded 172-176. The decoding 172-176 of the first entropy slice may comprise resetting the decoder state 172. If CABAC entropy decoding is used, the CABAC state may be reset. The neighbor information for the entropy decoding of the first entropy slice may be defined 174, and the first entropy slice data may be decoded 176. For each of the up to N entropy slices, these steps may be performed (178-182 for the Nth entropy slice). The decoder may reconstruct 184 the entropy slices when all, or a portion of, the entropy slices are entropy decoded.

When there are more than N entropy slices, a decode thread may begin entropy decoding a next entropy slice upon the completion of entropy decoding of an entropy slice. Thus when a thread finishes entropy decoding a low complexity entropy slice, the thread may commence decoding additional entropy slices without waiting for other threads to finish their decoding.

The arrangement of slices, as illustrated in FIG. 3, may be limited to defining each slice between a pair of macroblocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices, as illustrated in FIG. 4, is highly flexible in its arrangement but does not tend to lend itself to high efficient parallel encoding or decoding. Moreover, this highly flexible definition of slices is computationally complex to implement in a decoder.

Figure 7:
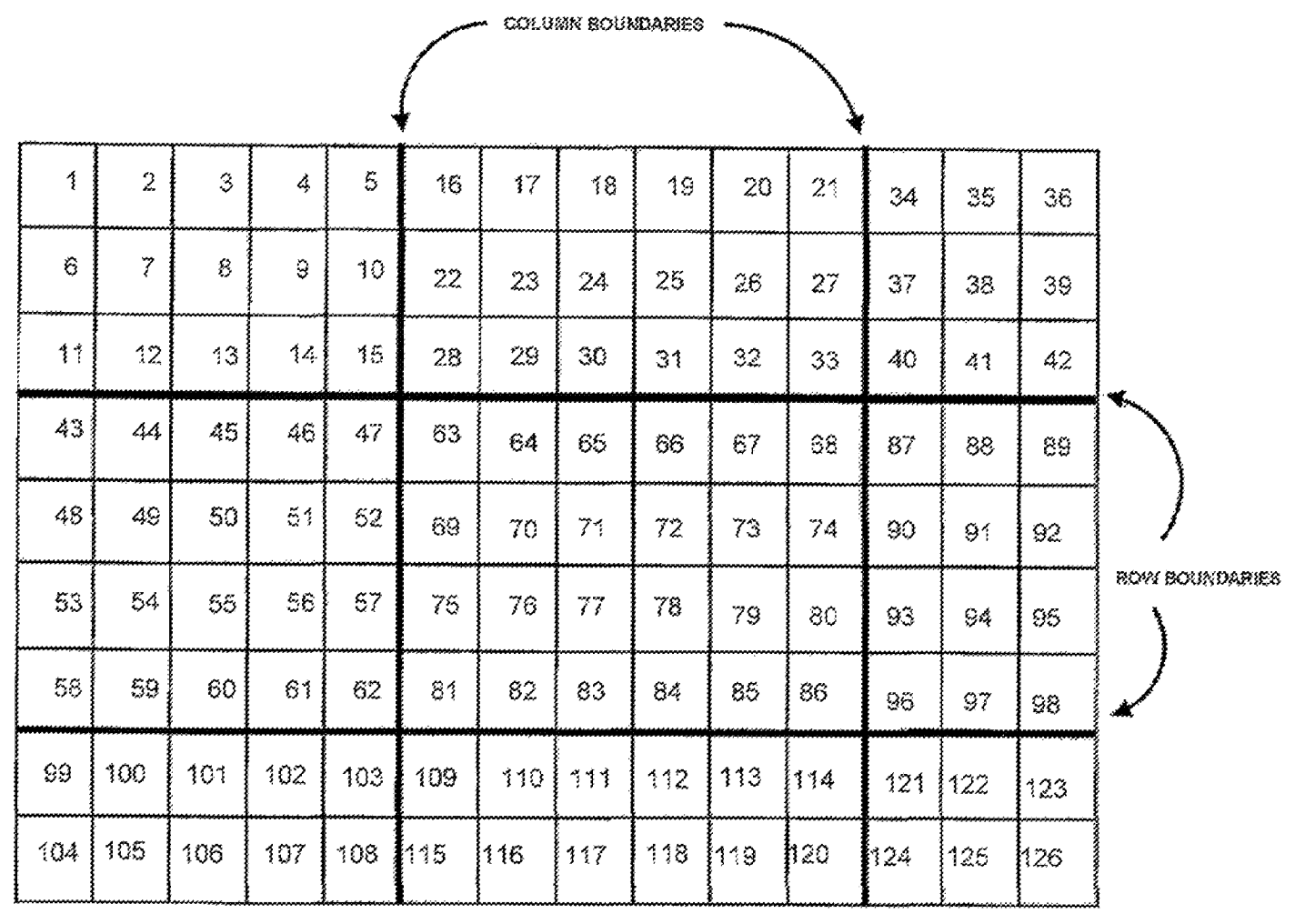

Referring to FIG. 7, a tile technique divides an image into a set of rectangular (inclusive of square) regions. The macroblocks (e.g., largest coding units) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 7. In some embodiments, macroblocks located in different tiles are not available for intra-prediction, motion compensation, entropy coding context selection or other processes that rely on neighboring macroblock information.

Figure 8:
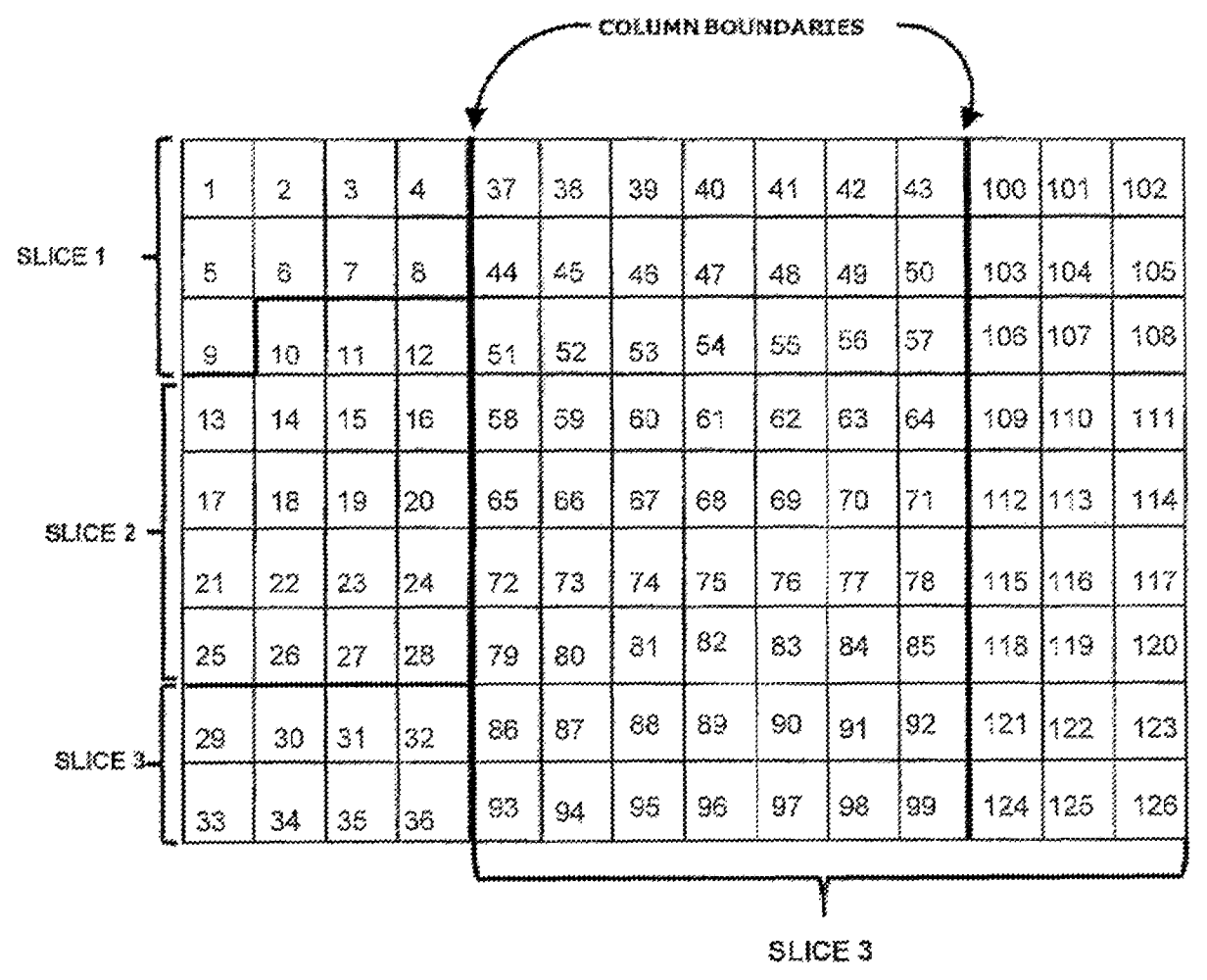

Referring to FIG. 8, the tile technique is shown dividing an image into a set of three rectangular columns. The macroblocks (e.g., largest coding units) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including macroblocks 1-9, slice 2 may be defined as including macroblocks 10-28, and slice 3 may be defined as including macroblocks 29-126 which spans three tiles. The use of tiles facilitates coding efficiency by processing data in more localized regions of a frame.

In one embodiment, the entropy encoding and decoding process is initialized at the beginning of each tile. At the encoder, this initialization may include the process of writing remaining information in the entropy encoder to the bit-stream, a process known as flushing, padding the bit-stream with additional data to reach one of a pre-defined set of bit-stream positions, and setting the entropy encoder to a known state that is pre-defined or known to both the encoder and decoder. Frequently, the known state is in the form of a matrix of values. Additionally, a pre-defined bit-stream location may be a position that is aligned with a multiple number of bits, e.g. byte aligned. At the decoder, this initialization process may include the process of setting the entropy decoder to a known state that is known to both the encoder and decoder and ignoring bits in the bit-stream until reading from a pre-defined set of bit-stream positions.

In some embodiments, multiple known states are available to the encoder and decoder and may be used for initializing the entropy encoding and/or decoding processes. Traditionally, the known state to be used for initialization is signaled in a slice header with an entropy initialization indicator value. With the tile technique illustrated in FIG. 7 and FIG. 8, tiles and slices are not aligned with one another. Thus, with the tiles and slices not being aligned, there would not traditionally be an entropy initialization indicator value transmitted for tiles that do not contain a first macro-block in raster scan order that is co-located with the first macroblock in a slice. For example referring to FIG. 7, macroblock 1 is initialized using the entropy initialization indicator value that is transmitted in the slice header but there is no similar entropy initialization indicator value for macroblock 16 of the next tile. Similar entropy initialization indicator information is not typically present for macroblocks 34, 43, 63, 87, 99, 109, and 121 for the corresponding tiles for the single slice (which has a slice header for macroblock 1).

Referring to FIG. 8, in a similar manner for the three slices, an entropy initialization indicator value is provided in the slice headers for macroblock 1 of slice 1, provided in the slice header for macroblock 10 of slice 2, and provided in the slice header for macroblock 29 of slice 3. However, in a manner similar to FIG. 7, there lacks an entropy initialization indicator value for the central tile (starting with macroblock 37) and the right hand tile (starting with macroblock 100). Without the entropy initialization indicator value for the middle and right hand tiles, it is problematic to efficiently encode and decode the macroblocks of the tiles in a parallel fashion and with high coding efficiency.

For systems using one or more tiles and one or more slices in a frame, it is preferable to provide the entropy initialization indicator value together with the first macroblock (e.g., largest coding unit) of a tile. For example, together with macroblock 16 of FIG. 7, the entropy initialization indicator value is provided to explicitly select the entropy initialization information. The explicit determination may use any suitable technique, such as for example, indicate that a previous entropy initialization indicator value should be used, such as that in a previous slice header, or otherwise send the entropy initialization indicator value associated with the respective macroblock/tile. In this manner, while the slices may include a header that includes an entropy index value, the first macroblock in a tile may likewise include an entropy initialization indicator value.

Figure 9A:
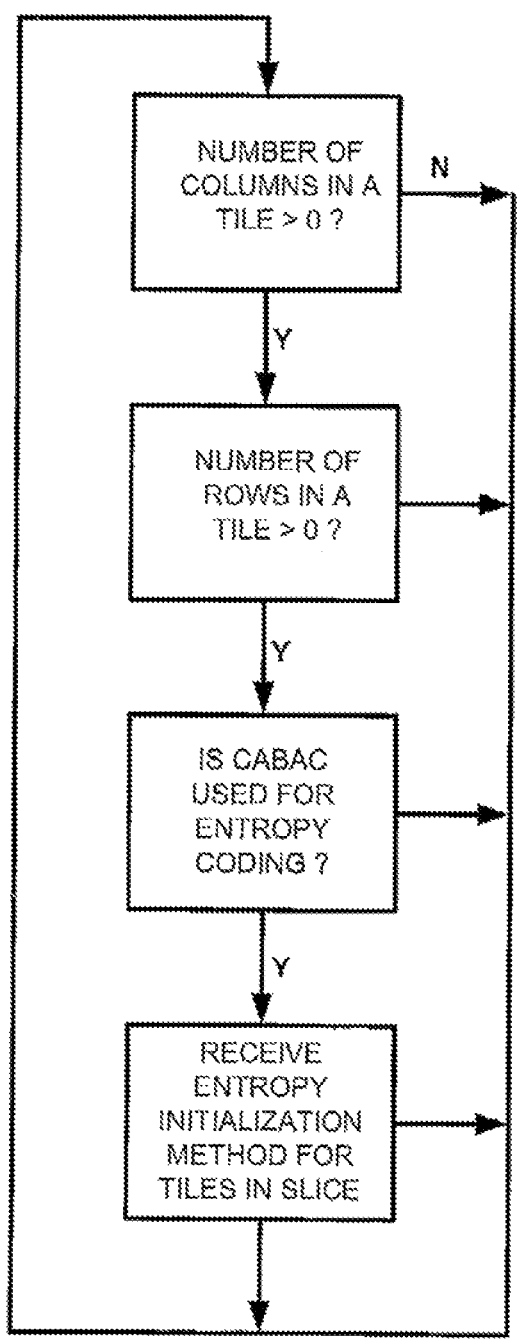
FIGS. 9A and 9B illustrate entropy selection for a tile.

Referring to FIG. 9A, the encoding of this additional information may be as follows:

If (num_column_minus1>0 && num_rows_min1>0) then
   tile_cabac_init_idc_present_flag num_column_minus1>0 determines if the number of columns in a tile is not zero and num_rows_min1>0 determines if the number of rows in a tile is not zero, which both effectively determine if tiles are being used in the encoding/decoding. If tiles are being used, then the tile_cabac_init_idc_present_flag is a flag indicating how the entropy initialization indicator values are communicated from an encoder to a decoder. For example, if the flag is set to a first value then a first option may be selected such as using a previously communicated entropy initialization indicator value. As a specific example, this previously communicated entropy initialization indicator value may be equal to the entropy initialization indicator value transmitted in the slice header corresponding to the slice containing the first macroblock of the tile. For example, if the flag is set to a second value then a second option may be selected such as the entropy initialization indicator value is being provided in the bitstream for the corresponding tile. As a specific example, the entropy initialization indicator value is provided within in the data corresponding to the first macro-block of the tile.

The syntax for signaling the flag indication how the entropy initialization indicator values are communicated from an encoder to a decoder may be as follows:

```
num_columns_minus1
num_rows_minus1
if (num_column_minus1>0 && num_rows_minus1>0 {
    tile_boundary_dependence_idr
    uniform_spacing_idr
    if( uniform_spacing_idr !=1) {
        for (i=0; i<num_columns_minus1; i++)
            columnWidth[i]
        for (i=0; i<num_rows_minus1; i++)
            rowHeight[i]
    }
    if( entropy_coding_mode==1)
        tile_cabac_init_idc_present_flag
}
```

Figure 9B:
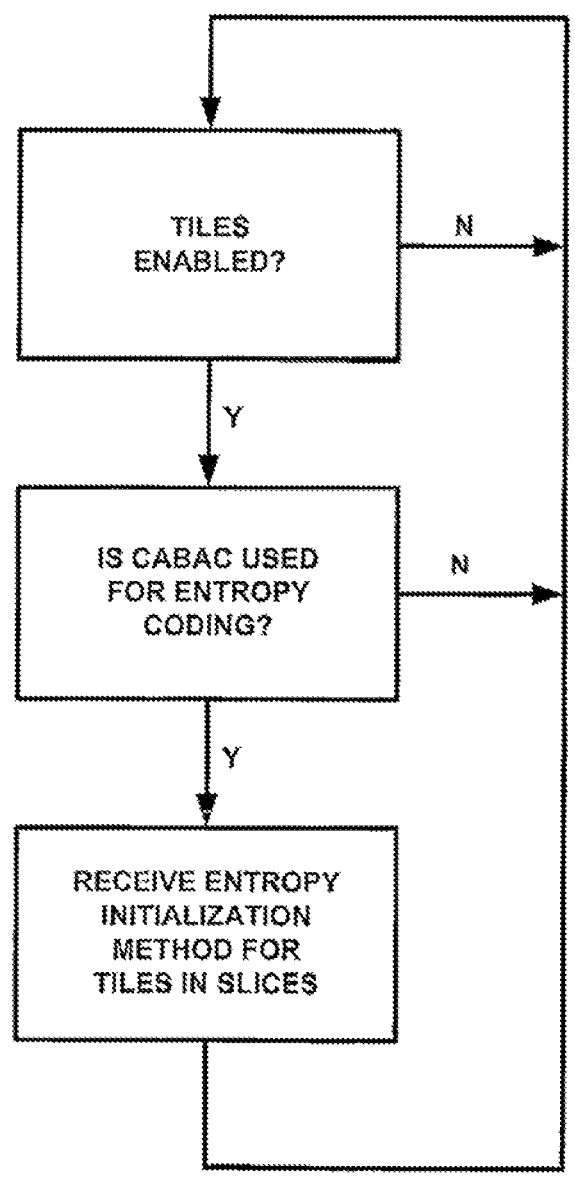

Referring to FIG. 9B, other techniques may be used to determine if tiles are being used, such as including a flag in a sequence parameter set (e.g., information regarding a sequence of frames) and/or a picture parameter set (e.g., information regarding a particular frame).

The syntax may be as follows:

```
tile_enable_flag
if (tile_enable_flag) {
    num_columns_minus1
    num_rows_minus1
    tile_boundary_dependence_idr
```

-continued

```
    uniform_spacing_idr
    if( uniform_spacing_idr !=1) {
        for (i=0; i<num_columns_minus1; i++)
            columnWidth[i]
        for (i=0; i<num_rows_minus1; i++)
            rowHeight[i]
    }
    if( entropy_coding_mode==1)
        tile_cabac_init_idc_present_flag
}
``` tile_enable_flag determines if tiles are used in the current picture.

Figure 10A:
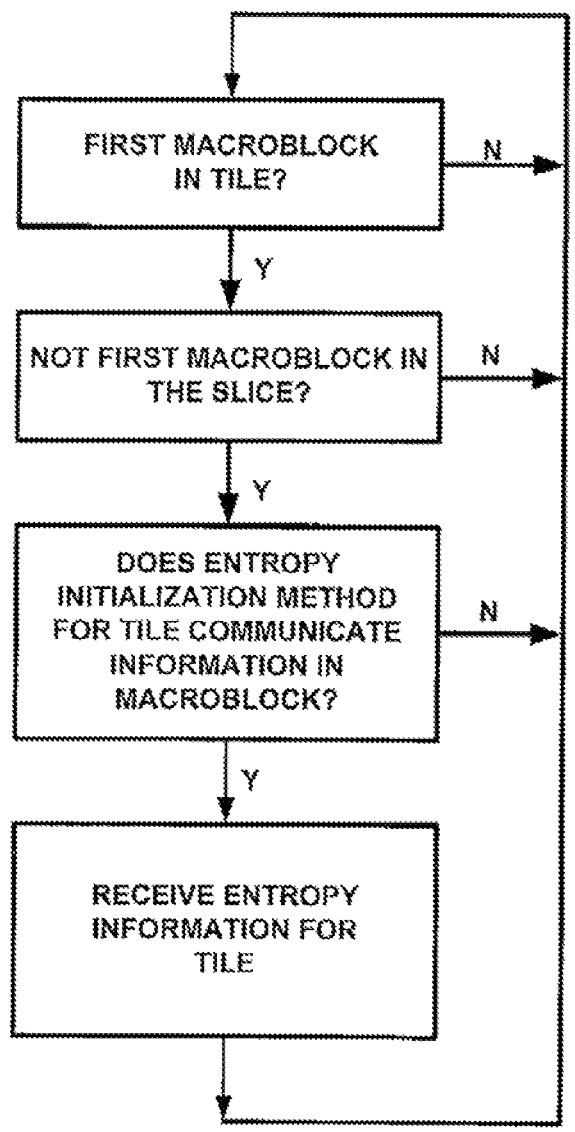
FIGS. 10A and 10B illustrates another entropy selection for a tile.
Figure 10B:
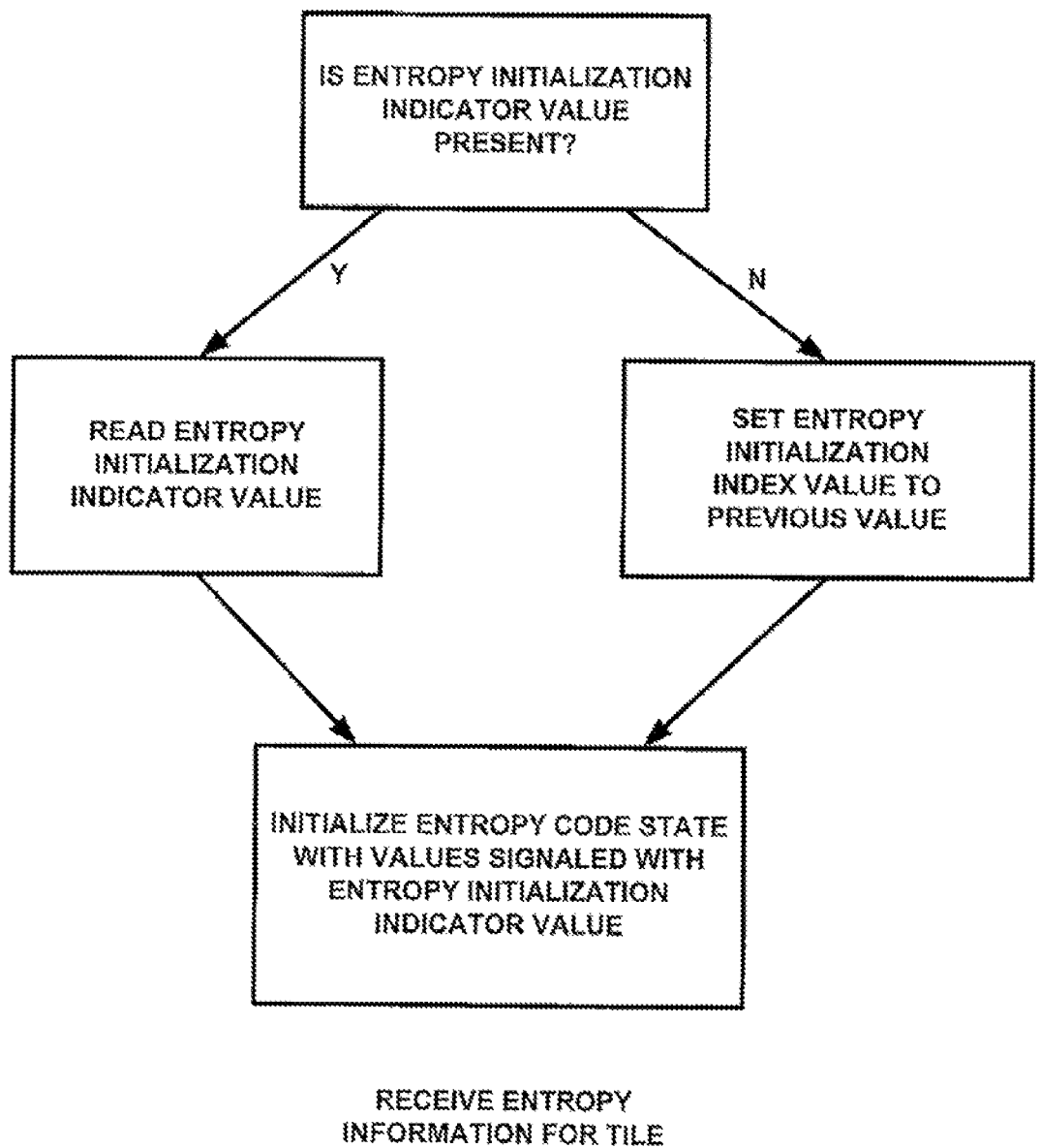

Referring to FIGS. 10A and 10B, a technique to provide a suitable entropy initialization indicator value information for a tile may be as follows.

First, check to see if the macroblock (e.g., coding unit) is the first macroblock in a tile. Thus, the technique determines the first macroblock of a tile that may include an entropy initialization indicator value. Referring to FIG. 7, this refers to macroblocks 1, 16, 34, 43, 63, 87, 99, 109, and 121. Referring to FIG. 8, this refers to macroblocks 1, 37, and 100.

Second, check to see if the first macroblock (e.g., coding unit) of the tile is not the first macroblock (e.g., coding unit) of the slice. Thus, the technique identifies additional tiles within the slice. Referring to FIG. 7, this refers to macroblocks 16, 34, 43, 3, 87, 99, 109, and 121. Referring to FIG. 8, this refers to macroblocks 37 and 100.

Third, check to see if the tile_cabac_init_idc_flag is equal to a first value and if tiles are enabled. In one specific embodiment, this value is equal to 0. In a second embodiment, this value is equal to 1. In an additional embodiment, tiles are enabled when (num_column_min1>0 && num_rows_min1>0). In another embodiment, tiles are enabled when tile_enable_flag equal to 1.

For such identified macroblocks the cabac_init_idc_present_flag may be set.

Then the system may only signal cabac_init_idc_flag if tile_cabac_init_idc_flag is present and if (num_column_minus1>0 && num_rows_min1>0). Thus, the system only sends the entropy information if tiles are being used and the flag indicates the entropy information is being sent (i.e., cabac_init_idc_flag).

The coding syntax may be as follows:

```
coding_unit (x0, y0, currCodingUnitSize) {
    If (x0==tile_row_start_location &&
        y0=tile_col_start_location
    && currCodingUnitSize==MaxCodingUnitSize &&
    tile_cabac_init_idc_flag==true && mb_id!=first_mb_in_slice {
        cabac_init_idc_present_flag
        if (cabac_init_idc_present_flag)
            cabac_init_idc
    }
    a regular coding unit...
}
```

In general, one or more flag(s) associated with the first macroblock (e.g., coding unit) of a tile not associated with the first macroblock of a slice may define an entropy initialization indicator value. A flag may indicate whether the entropy initialization indicator value is previously provided information, a default value, or otherwise entropy initialization indicator value to be provided.

Figure 11:
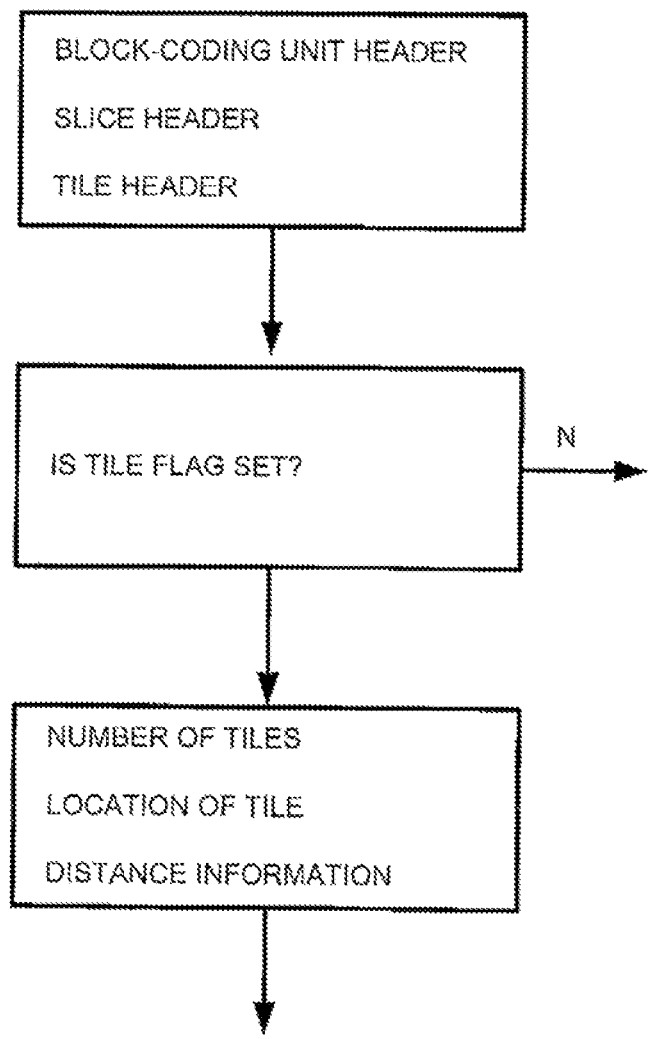
FIG. 11 illustrates yet another entropy selection for a tile.

Referring again to FIG. 7, the decoder knows the location of macroblock 16 in the picture frame but due to entropy encoding is not aware of the positions of bits describing macroblock 16 in the bitstream until macroblock 15 is entropy decoded. This manner of decoding and identifying the next macroblock maintains a low bit overhead, which is desirable. However, it does not facilitate tiles to be decoded in parallel. To increase the ability to identify a specific position in the bit-stream for a specific tile in a frame, so that the different tiles may be simultaneously decoded in parallel in the decoder without waiting for completion of the entropy decoding, a signal may be included in the bitstream identifying the location of tiles in the bit-stream. Referring to FIG. 11, the signaling of the location of tiles in the bit-stream is preferably provided in the header of a slice. If a flag indicates that the location of tiles in the bitstream is transmitted within the slice, then in addition to the location within the slice of the first macroblock of each of the tile(s) within the slice it also preferably includes the number of such tiles within the frame. Further, the location information may be included for only a selected set of tiles, if desired.

The coding syntax may be as follows:

```
tile_locations_flag
  if (tile_location_flag) {
    tile_locations( )
  }
  tile_locations( )
  {
  for (i=0; i<num_of_tiles_minus1; i++) {
    tile_offset[i]
  }
  }
``` tile_locations_flag signals if the tile locations are transmitted in the bitstream. The tile_offset[i] may be signaled using absolute location values or differential size values (change in tile size with respect to previously coded tile) or any suitable technique.

While this technique has low overhead, the encoder can not generally transmit the bit stream until all the tiles are encoded.

In some embodiments it is desirable to include data related to the largest absolute location value or largest differential size value, also considered a largest value, of sequential tiles. With such information, the encoder can transmit only the number of bits necessary to support the identified largest value; the decoder can receive only the number of bits necessary to support the identified largest value. For example, with a relatively small largest value only a small bit depth is necessary for the tile location information. For example, with a relatively large largest value, a large bit depth is necessary for the tile location information.

As another technique to increase the ability to identify different tiles, so that the different tiles may be processed in parallel in the decoder without waiting for the entropy decoding, markers within the bitstream associated with the start of each tile may be used. These tile markers are included within the bitstream in such a manner that they can be identified without entropy decoding of that particular portion of the bitstream. In one embodiment the marker may begin with 0x000001, in another embodiment the marker may begin with 0x000002, in another embodiment the marker may begin with 0x000004, or any other suitable sequence of bits. Furthermore, the marker may include additional headers associated with a tile and/or the first macroblock of the tile. In this manner the encoder can write each tile to the bitstream after it is encoded without waiting until all the tiles are encoded, although the bit rate is increased as a result. In addition, the decoder can parse the bitstream to identify the different tiles in a more efficient manner, especially when used in conjunction with buffering.

The tile headers may be similar to the slice headers, although less information is typically included. The principal information required is the macroblock number of the next block and entropy initialization data and slice index (indicating, to which slice the starting CU in the tile belongs). The coding syntax of such a tile header may be as illustrated in FIG. 12A. Alternatively, the principal information may also include the initial quantization parameter. The coding syntax of such a tile header may be as illustrated in FIG. 12B. Values that is not transmitted in the slice header and not in the tile header may be reset to the values transmitted in the slice header.

In some embodiments, markers are included in the bitstream and associated with the start of a tile. However, markers may not be included for every tile in the bitstream. This facilitates and encoder and decoder to operate a different levels of parallelism. For example, an encoder could use 64 tiles while only including 4 markers in the bitstream. This enables parallel encoding with 64 processes and parallel decoding with 4 processes. In some embodiments, the number of markers in the bitstream is specified in a manner known both to the encoder and decoder. For example, the number of markers may be signaled in the bitstream or defined with a profile or level.

In some embodiments, location data is included in the bitstream and associated with the start of a tile. However, location data may not be included for every tile in the bitstream. This facilitates and encoder and decoder to operate a different levels of parallelism. For example, an encoder could use 64 tiles while only including 4 locations in the bitstream. This enables parallel encoding with 64 processes and parallel decoding with 4 processes. In some embodiments, the number of locations in the bitstream is specified in a manner known both to the encoder and decoder. For example, the number of markers may be signaled in the bitstream or defined with a profile or level.

Figure 13:
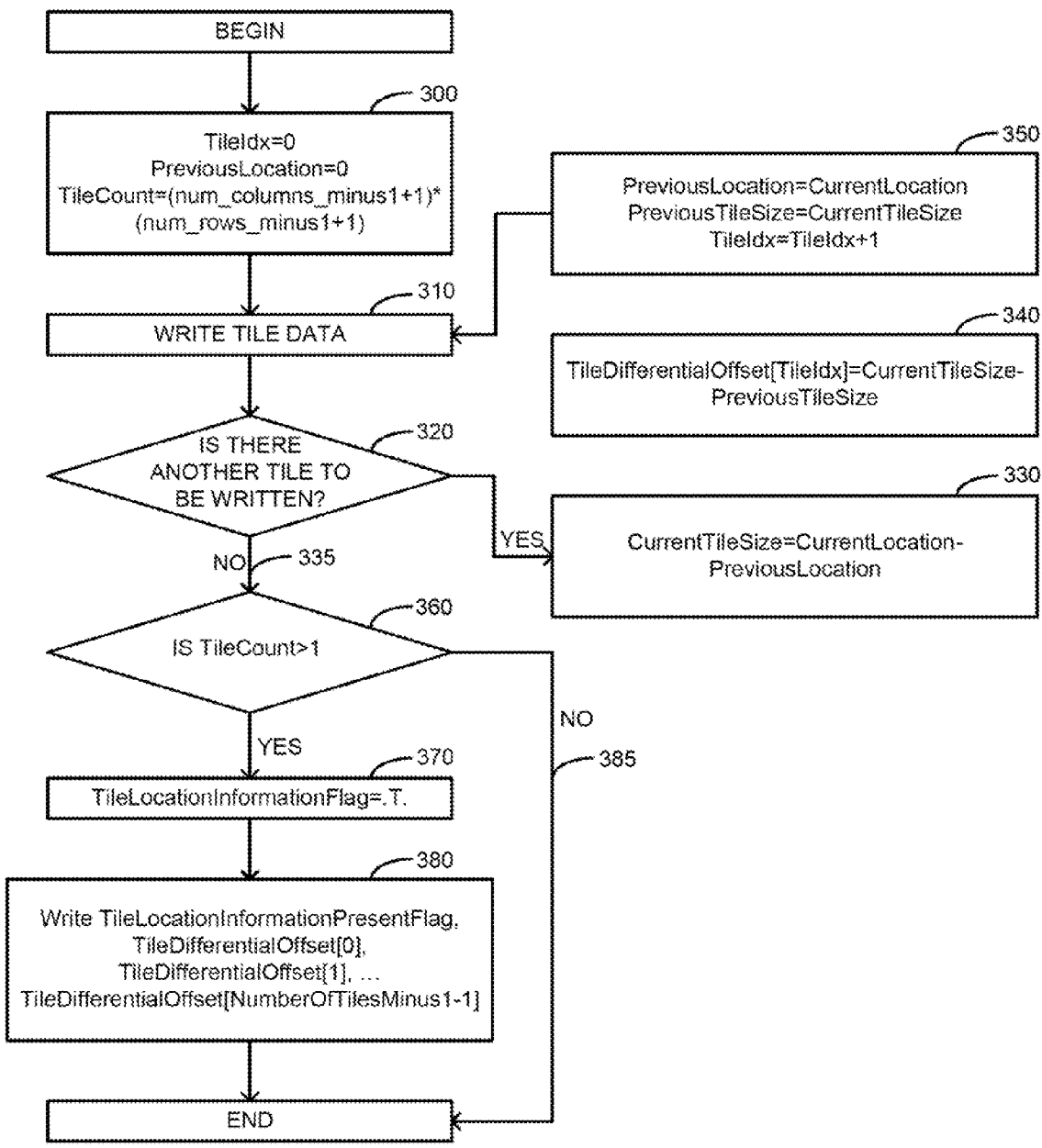
FIG. 13 illustrates an explicit signal for the start of a tile.

Referring to FIG. 13, one exemplary technique for explicitly identifying the start of a tile is illustrated. The value of a tile index is initialized (TileIdx=0), the value of a previous tile location is initialized (PreviousLocation=0), the value of a previous tile size is initialized (PreviousTileSize=0), and the value of a number of tiles is initialized (TileCount=(num_columns_minus1+1)*(num_rows_minus1+1) 300. The tile data is written to the bit-stream of the first largest coding unit (LCU) of the tile 310, which in the initial case of a picture is typically the LCU in the upper left hand corner. Tile data is the data necessary to reconstruct the pixel values within a tile. If there is another tile to be written 320 then a set of values may be modified. A current tile size may be updated which indicates the number of largest coding units in the tile (CurrentTileSize=CurrentLocation−PreviousLocation) 330, where CurrentLocation is the position of the start of the current tile in the bitstream. In an alternative embodiment, the current tile size may be updated to indicate the number of coding units in the tile. A tile differential offset 340 may be updated which indicates an offset between the current file size and the previous tile size. The previous location may be set to the current location (PreviousLocation=CurrentLocation), the previous tile size may be set to the current tile size (PreviousTileSize=CurrentTileSize), and the tile index may be incremented (TileIdx=TileIdx+1) 350. The first LCU of the next tile may be written with data 310. This recursive process is repeated until there are no additional tiles to be written 355 within a slice.

If the tile count is greater than one (TileCount>1) 360 then the presence of the tile location information flag may be set (TileLocationInformationPresentFlag=.T.) 370. Also, a set of values may also be written 380, including for example, TileLocationInformationFlag, TileDifferentialOffset[0], TileDifferentialOffset[1], . . . , TileDifferentialOffset[NumberOfTilesMinus1−1], where NumberOfTilesMinus1 is equal to TileCount-1. In some embodiments the set of values 380 is written to the slice header. In the case that there is only one tile 360, then the storing of the additional data related to the tiles is skipped 385. In some embodiments, TileDifferentialOffset represents the tile size within current slice.

Figure 14:
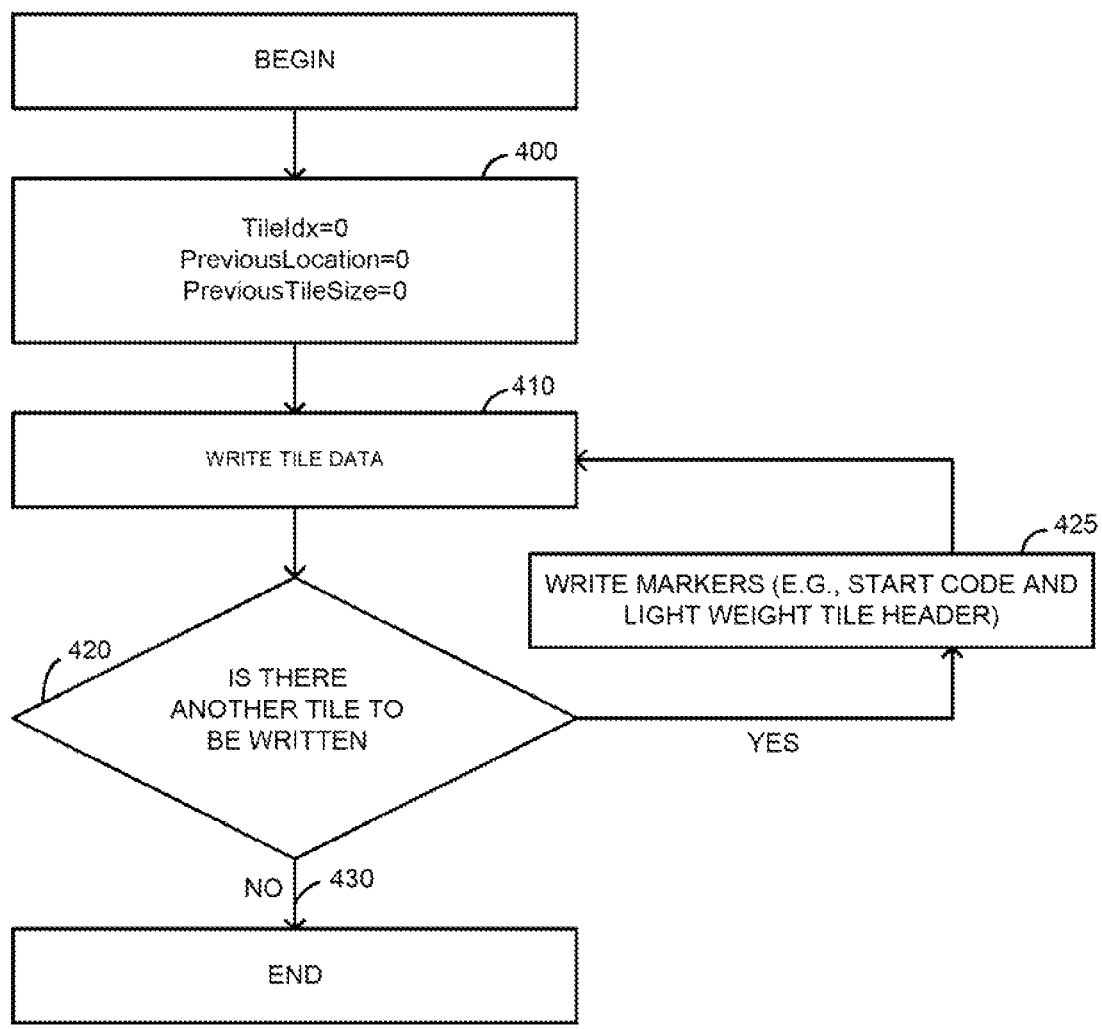
FIG. 14 illustrates an implicit signal for the start of a tile.

Referring to FIG. 14, one exemplary technique for implicitly identifying the start of a tile is illustrated. The value of a tile index is initialized (TileIdx=0), a previous tile location is initialized (PreviousLocation=0), and a previous tile size is initialized (PreviousTileSize=0) 400. The tile data is written to the bit-stream of the first largest coding unit (LCU) of the tile 410, which in the initial case of a picture is typically the LCU in the upper left hand corner. If there is another tile to be written 420 then a set of values are written to a coding unit of a tile 425. The values written 425 may include markers and/or tile header information, where tile header and light weight tile header or equivalent. The tile header information, may include for example, the largest coding unit address, the slice index, and quantization parameter information. The first LCU of the next tile is written with data 410. This recursive process is repeated until there are no additional tiles to be written 430. It is to be understood, that both implicit and/or explicit signaling of the tile start locations may be included within the bitstream.

Figure 15:
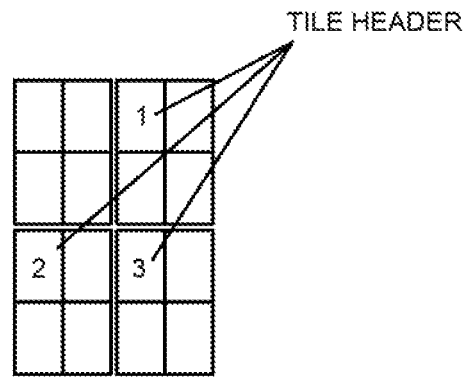
FIG. 15 illustrates a set of light weight tile headers.

Referring to FIG. 15, the tile header may include one or more of a tile index value, in addition to the LCU address, the slice index, and/or the quantization parameter information. In some cases, the LCU address is replaced by a tile index value, TileIdx. In some cases, the slice index is replaced by a slice parameter set index that indicates a slice parameter set previously transmitted within the bitstream. A slice parameter set may contain but is not restricted to values for quantization parameter, entropy coder initialization parameters, reference list parameters, or loop filter parameters, The tile index value may be any suitable value, such as for example, the tile index minus 1. In this manner the tiles are numbered in a sequential manner, with the first tile having a number of 0. By including a tile index value, the decoding of the tiles is less computationally complex. In some embodiments of the invention, tile index values are only in tile headers that do not correspond to a first tile in the bit-stream or slice.

In addition, for a particular slice a flag may be included in the tile header that indicates whether to use the current information in the slice header or previously transmitted information in a slice header. This further reduces the computational complexity of the system and also reduces the bit rate of the bitstream.

In one embodiment of the invention, the presence of the flag may be indicated in the bitstream with a slice_parameter_set_present_flag. The syntax for the slice_parameter_set_present_flag may be as follows:

| Pic_parameter_set_rbsp( ) { | Descriptor |
|---|---|
| pic_parameter_set_id | ue(v) |
| ... | |
| Slice_parameter_set_present_flag | u(1) |
| Rbsp_trailing_bits( ) | |
| } | |

The slice_parameter_set_present_flag signals in the bitstream whether slice parameter sets are transmitted. One exemplary syntax is for the picture parameter set. The slice parameter set index is transmitted in the bit-stream only in the that the slice_parameter_set_present_flag indicates that slice parameter sets are transmitted in the bit-stream. If "slice_parameter_set_present_flag" is present and is set to a TRUE value then slice_parameter_set_flag is signaled. If "slice_parameter_set_present_flag" is present and set to a FALSE value then slice_parameter_set_flag is not signaled. In some embodiments, when "slice_parameter_set_present_flag" is set to a FALSE value, then information from previously transmitted slice headers is used. In some embodiments, the TRUE value may be equal to 1. In some embodiments, the FALSE value may be equal to 0. For some tile headers this process may be skipped as signaled by the flag slice_parameter_set_flag, as indicated below. For some embodiments of the invention, the flag slice_parameter_set_flag is inferred to be a true value.

Figure 16:
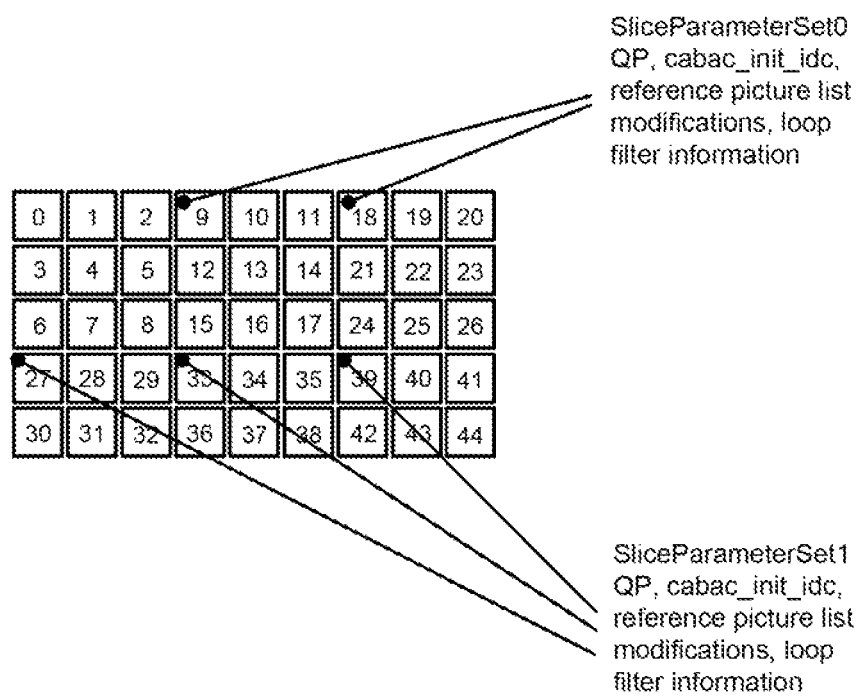
FIG. 16 illustrates sets of slice parameter index sets.

Referring to FIG. 16, the tile header may also include a slice parameter set index value. The slice parameter set index value may refer to one or more sets of slice parameter sets, which are the previously transmitted information in a slice header. Each of the slice parameter sets may include, for example, a quantization parameter (QP), context-based adaptively binary arithmetic coding information (cabac_init_idc), a reference picture list modification, or loop filter information. The loop filter information, typically includes for example, adaptive loop filter information, sample adaptive offset information, or deblocking filter information.

An exemplary syntax for a tile header is as follows:

| Tile_header( ){ | Descriptor |
|---|---|
| tile_idx−1 | u(v) |
| If (slice_parameter_set_present_flag) | |
| { | |
| Slice_parameter_set_flag | u(1) |
| If (slice_parameter_set_flag) | |
| Slice_parameter_set_id | ue(v) |
| } | |
| ... | | slice_parameter_set_id: represents the slice parameter set index value and refers to a particular slice parameter set previously transmitted within the bitstream. FIG. 16 illustrates how different tile headers may contain two different slice_parameter_set_id and refer to two different slice parameter sets previously transmitted within the bitstream.

The tile_idx-1 may specify the tile index minus 1. The tile_idx-1 may be an unsigned number. The tile_idx-1 may use v-bits where v is determined based upon the maximum number of tiles in the picture. For example, v may be calculated as: RoundAbove(log 2(TileCount-1)) where RoundAbove(x) represents rounding to the first integer value equal to or larger than x.

As previously described, the slice_parameter_set_flag specifies if a slice_parameter_set_id is transmitted in the bitstream. If the slice_parameter_set_flag is a first value no slice_parameter_set_id is transmitted in the bitstream and the existing active slice parameter set is used for the tile. In one embodiment, the active slice parameter set is the slice parameter set used by the previous tile. In a second embodiment, the active slice parameter set is the slice parameter set used by the last coding unit in the previous tile. If slice_parameter_set_flag is a second value, a slice_parameter_set_id is transmitted in the bitstream. In one embodiment, the first and second values are 0 and 1, respectively.

The slice parameter set_id specifies the slice parameter set id referred to by the tile.

Figure 17:
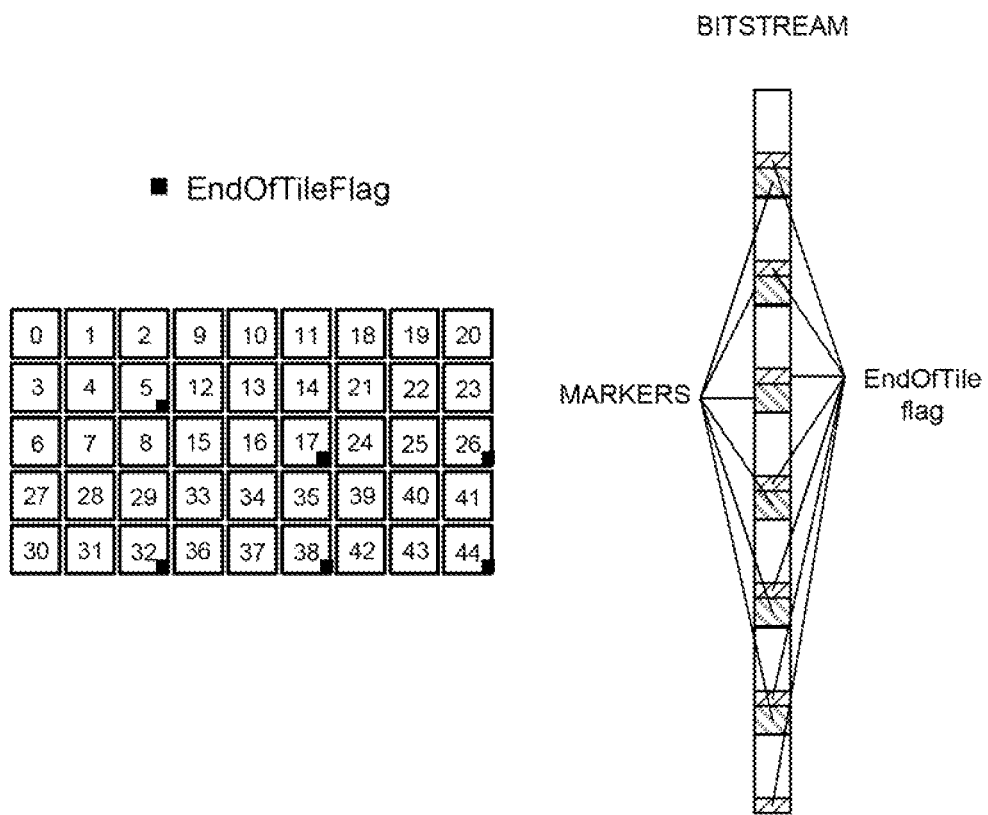
FIG. 17 illustrates end of tile flags.

Referring to FIG. 17, a flag may be included at the end of the tile to indicate its end. In this manner, the computational complexity with determining the end of the tile may be simplified.

In some cases, the description has illustrated techniques for the creation of the bitstream with suitable data for the slices and/or tiles. With this information being included within the bitstream in a suitable manner, the decoder can similarly receive this data and use it to more effectively decode the bitstream.

Figure 18:
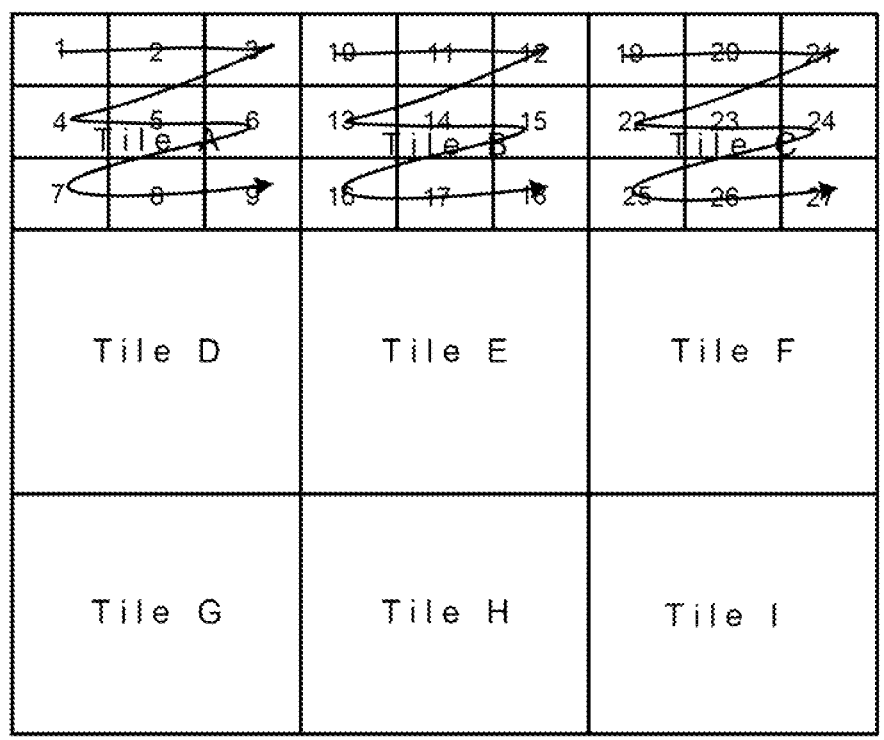
FIG. 18 illustrates a decoding order for a frame including tiles and largest coding units.

Referring to FIG. 18, preferably the decoding information, such as that suitable for intra-prediction, motion information, and entropy decoding for a particular tile does not depend on such information from another tile. In some cases, the deblocking filtering for one tile may be permitted to use information from adjacent tiles. As previously described, the macroblocks (e.g., largest coding units) for each tile may be provided in the bitstream in raster scan order (Tile A: LCU 1, LCU 2, LCU 3, LCU 4, LCU 5, LCU 6, LCU 7, LCU 8, LCU 9), (Tile B: LCU 10, LCU 11, LCU 12, LCU 13, LCU 14, LCU 15, LCU 16, LCU 17, LCU 18), (Tile C: LCU 10, LCU 20, LCU 21, LCU 22, LCU 23, LCU 24, LCU 25, LCU 26, LCU 27), with each tile being provided in a raster scan order (e.g., Tile A, Tile B, Tile C, Tile D, Tile E, Tile F, Tile G, Tile H, Tile I) within each frame (e.g., picture). Preferably, the characteristics of the slices are likewise maintained. While such an arrangement of providing the LCU within a tile in raster scan order together with providing the tiles in raster scan is computationally efficient for decoders that include parallel processing capabilities, such an arrangement is not computationally efficient for decoders that do not include parallel processing capabilities.

Referring to FIG. 19, to improve the computational efficiency of the system for decoders that do not include parallel processing capabilities it is preferable to provide the marcroblocks (e.g., largest coding units) in a raster scan order (LCU 1, LCU 2, LCU 3, LCU 10, LCU 11, LCU 12, LCU 19, LCU 20, LCU 21, LCU 4, LCU 5, LCU 6, LCU 13, LCU 14, LCU 15, LCU 22, LCU 23, LCU 24, LCU 7, LCU 8, LCU 9, LCU 16, LCU 17, LCU 18, LCU 25, LCU 26, LCU 27), for the frame (e.g., picture), while maintaining that the decoding information, such as that suitable for intra-prediction, motion information, and entropy decoding for a particular tile (Tile A, Tile B, Tile C, Tile D, Tile E, Tile F, Tile G, Tile H, Tile I) does not depend on such information from another tile, while optionally permitting deblocking filtering for one tile to use information from adjacent tiles. Preferably, the characteristics of the slices are likewise maintained. While such an arrangement of providing the LCU for a frame in raster scan order while maintaining the characteristics of the tiles is computationally efficient for decoders that do not include parallel processing capabilities, such an arrangement is not as computationally efficient for decoders that include parallel processing capabilities.

Figure 20:
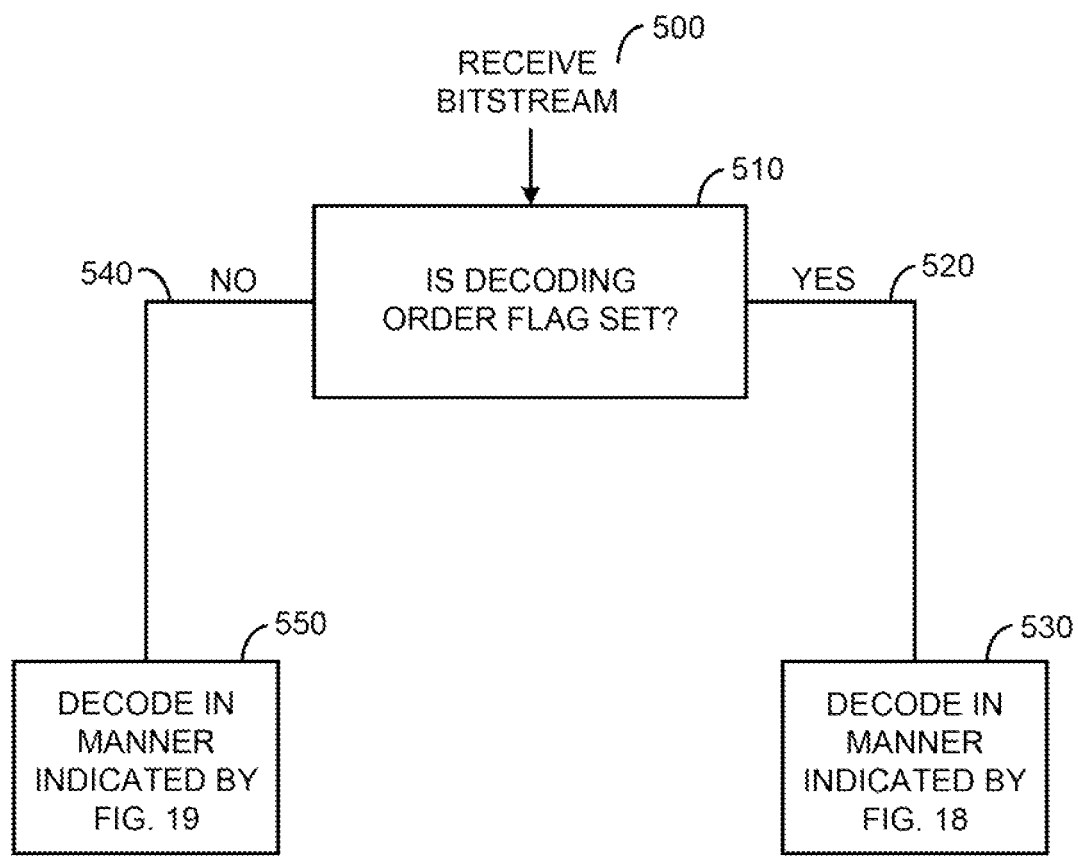
FIG. 20 illustrates a decoding order flag set.

Referring to FIG. 20, one manner to provide a system more suitable for decoders that include parallel processing capabilities and for decoders that do not include parallel processing capabilities, while maintaining the characteristics of the tiles, is to include a decoding order flag 510 in the bitstream to indicate whether the bitstream 500 is provided in the manner indicated by FIG. 18, or in a manner indicated by FIG. 19. If the decoding order flag is set 520, then the bitstream is indicated as being suitable for decoding in the manner indicated by FIG. 18 530. If the decoding order flag is not set 540, then the bitstream is indicated as being suitable for decoding in the manner indicated by FIG. 19 550. In many situations, depending on the intended destination, or otherwise the decoder or a process associated with the decoder, may indicate to an encoder of which manner of encoding is preferred.

Figure 21:
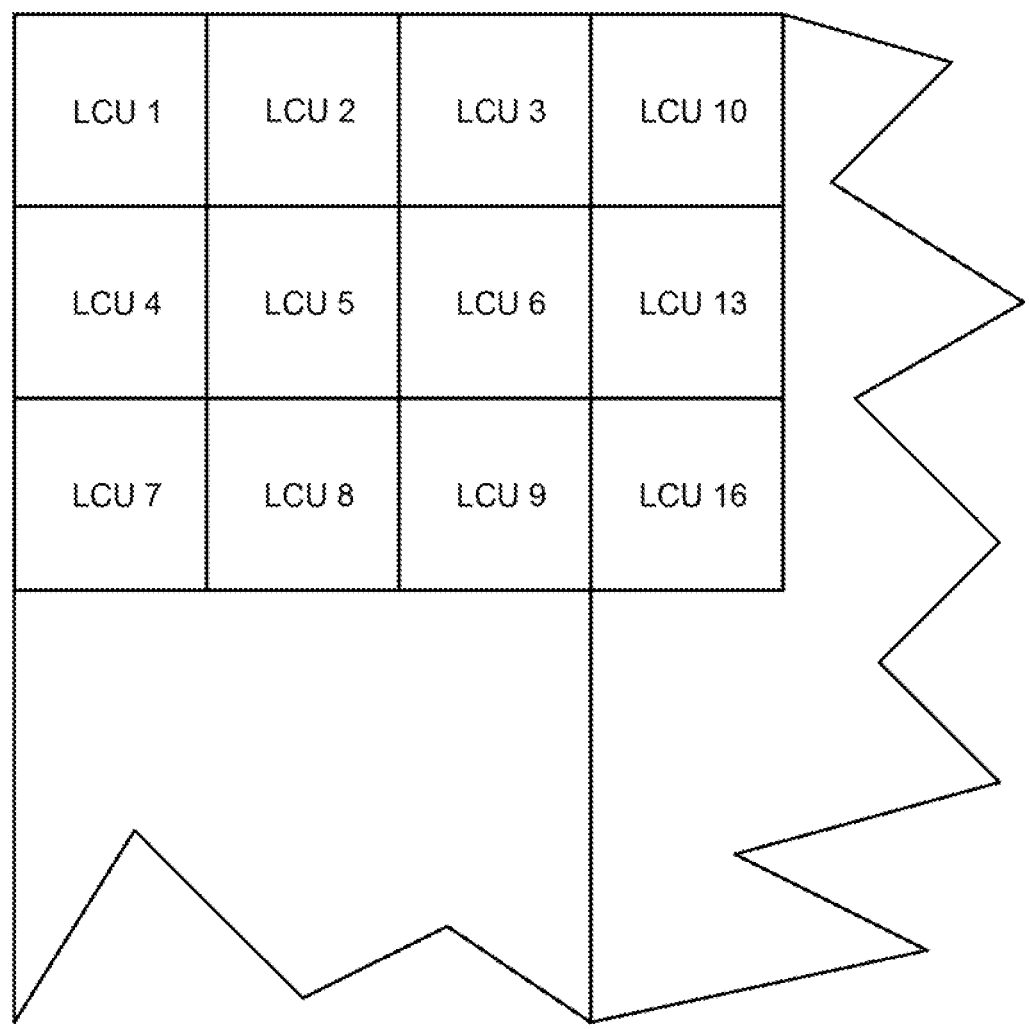
FIG. 21 illustrates a set of local coding units for tiles.

Referring to FIG. 21, the entropy encoding suitable for the technique described in FIG. 18 results in a bitstream where the symbols of one macroblock (e.g., largest coding unit) are adjacent to the symbols for the next macroblock. For example, the symbols of LCU 1 are followed by the symbols of LCU 2, which are followed by the symbols of LCU 3, which are followed by the symbols of LCU 4, which are followed by the symbols of LCU 5, which are followed by the symbols of LCU 6, which are followed by the symbols of LCU 7, which are followed by the symbols of LCU 8, which are followed by the symbols of LCU 9. In many cases, symbols of the LCU 3 and symbols of LCU 4 may be encoded using the same bit of the entropy encoder, such as a CALVC based technique or a CABAC based technique. Here, symbols denote information necessary to decode an LCU, such as motion information, quantized, transform coefficients, and/or intra-frame prediction information, and/or other information. Similarly, symbols of the LCU 6 and symbols of LCU 7 may be encoded using the same bit of the entropy encoder, such as a CALVC based technique or a CABAC based technique. While such encoding may be suitable for parallel based encoders, it results in additional computational complexity to account for the shared encoding bits at opposing ends of a row within a tile, when reordering the bitstream to be in a manner that is in a raster scan order across an entire frame which is more suitable for decoders that do not include parallel processing capabilities.

Similarly, the entropy encoding suitable for the technique described in FIG. 19 results in a bitstream where the symbols of one macroblock (e.g., largest coding unit) are adjacent to the symbols for the next macroblock, which are encoded across tile boundaries in some cases. For example, the symbols of LCU 1 are followed by the symbols of LCU 2, which are followed by the symbols of LCU 3, which are followed by the symbols of LCU 10, and so forth. In many cases, symbols of the LCU 3 and symbols of LCU 10 may be encoded using the same bit of the entropy encoder, such as a CALVC based technique or a CABAC based technique. Similarly, symbols of the LCU 6 and symbols of LCU 13 may be encoded using the same bit of the entropy encoder, such as a CALVC based technique or a CABAC based technique. Similarly, symbols of the LCU 9 and symbols of LCU 16 may be encoded using the same bit of the entropy encoder, such as a CALVC based technique or a CABAC based technique. While such encoding may be suitable for encoders that do not include parallel processing capabilities, it results in additional computational complexity to account for the shared encoding bits at tile boundaries within a frame, when reordering the bitstream to be in a manner that is in a raster scan within each tile which is more suitable for decoders that include parallel processing capabilities.

Figure 22:
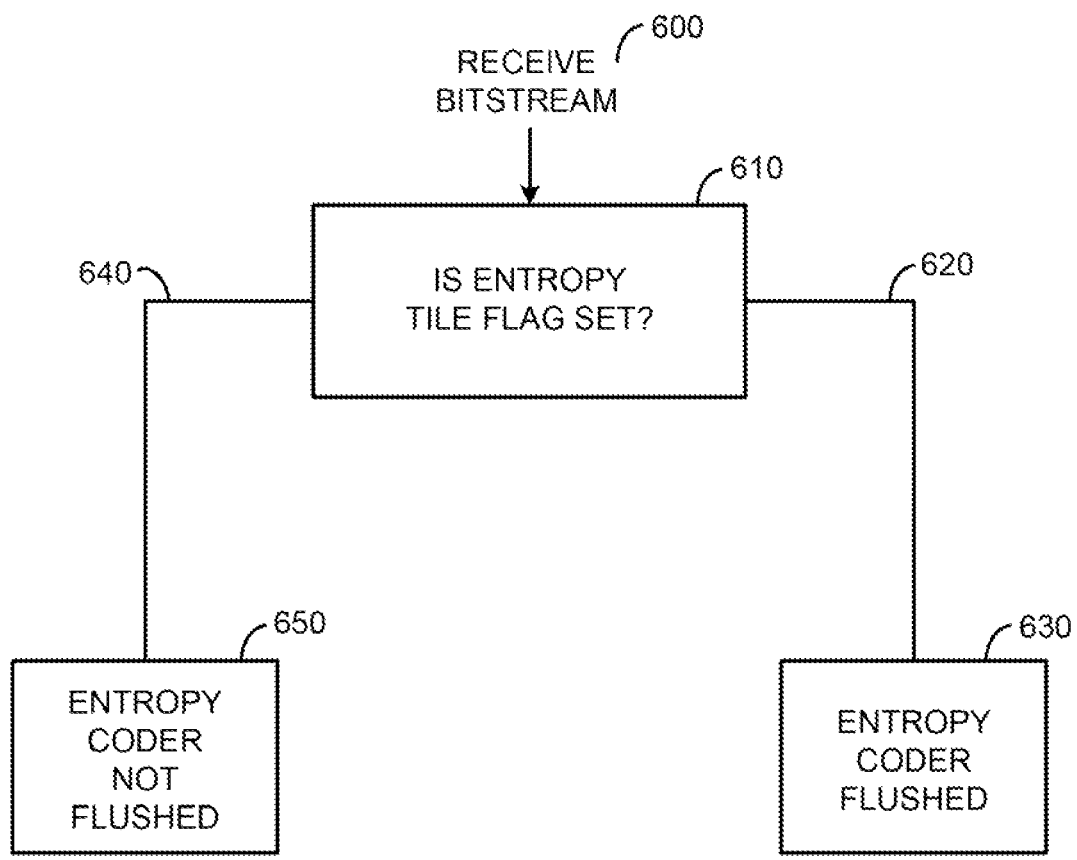
FIG. 22 illustrates an entropy tile flag set.

Referring to FIG. 22, to reduce the computational complexities of the system, it is desirable to include an entropy tile flag 610 preferably associated with a frame within the bitstream 600, that indicates whether the entropy coder is flushed at the end of each largest coding unit at a tile boundary (e.g., LCU 3, LCU 6, LCU 9, LCU 12, LCU 15, LCU 18, LCU 21, LCU 24, LCU 27). Flushing the entropy coder at each boundary results in the entropy data for the next LCU, whether it is within the same tile or across tile boundaries, not being dependent on a previous LCU. In this manner, the same bit is not used to encode both LCUs. This facilitates a more computationally efficient encoder and/or decoder.

Figure 23:
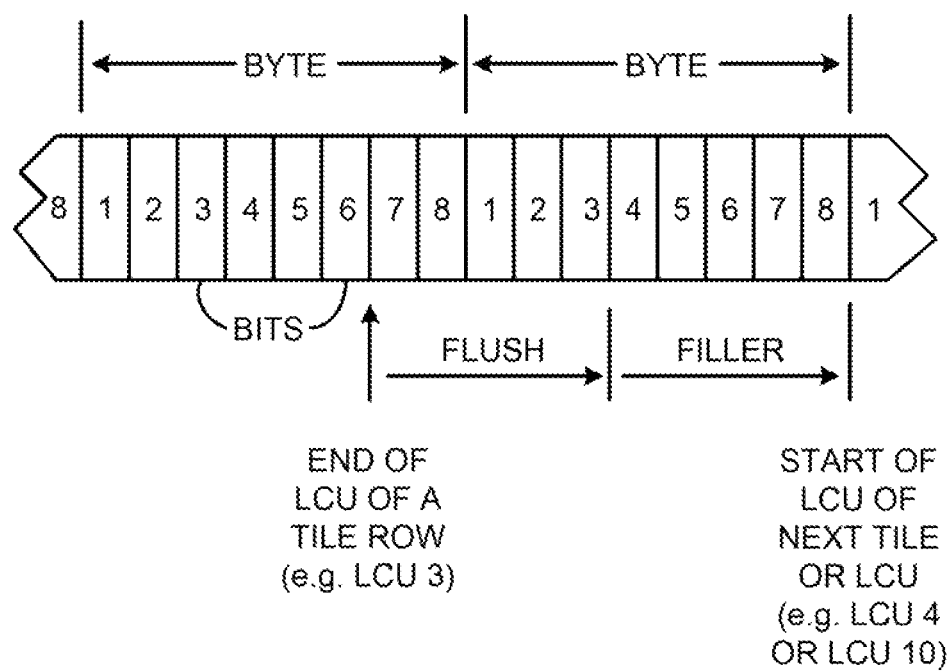
FIG. 23 illustrates an entropy decoding flush and byte based fill.

In many cases, after the flushing to the entropy coder, the first bit corresponding to symbols for the next LCU will not be aligned with a byte boundary. Referring to FIG. 23, to increase the computational efficiency of the encoder and/or decoder in reordering bytes as needed, while at the same time decreasing the encoding efficiency of the bitstream, it is desirable to include filler data from the end of the flush until a subsequent bit is aligned with the next byte in the bitstream.

Figure 24:
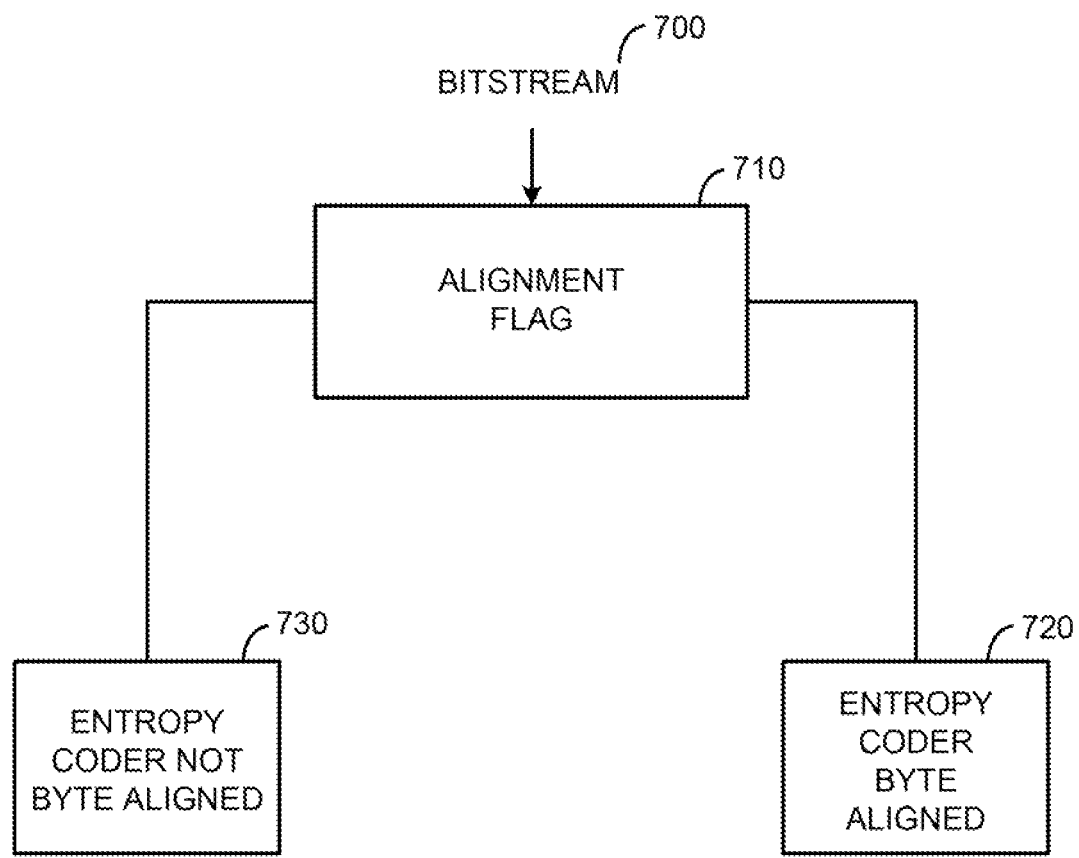
FIG. 24 illustrates an alignment flag set.

Referring to FIG. 24, one manner to provide a system more suitable for different processing capabilities is to include an alignment flag 710 in the bitstream to indicate whether the entropy coder is byte aligned after flushing. If the alignment flag 710 is set, then the entropy coder is byte aligned 720. If the alignment flag 710 is not set, then the entropy coder is not byte aligned 730.

Figure 25:
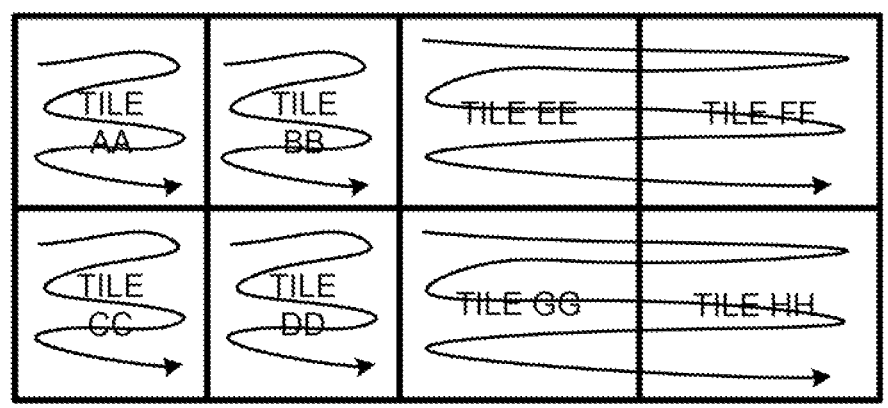
FIG. 25 illustrates a mixed tile raster scan order technique.

Referring to FIG. 25, in some situations it is desirable to include raster scan order within selected tiles (e.g., Tile AA, Tile BB, Tile CC, Tile DD, similar in a manner to FIG. 18), while at the same time permitting raster scan order across selected tiles (e.g., Tile EE, Tile FF, Tile GG, Tile HH, similar in a manner to FIG. 19). Also, the raster scan order may be for the frame may be based upon blocks of tiles, such as the block including Tiles AA-DD, and then the block including Tiles EE-HH.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for decoding a video bit-stream using at least one processor comprising:
   (a) receiving a bit-stream of a frame of video that includes at least one slice and at least one tile, where each of the at least one slice is decoded independently of another one of the at least one slice and includes the at least one tile, wherein the at least one tile is a rectangular region of the frame and includes coding units for the decoding arranged in a raster scan order;
   (b) receiving first information indicating whether location information of the at least one tile is transmitted within the at least one slice;
   (c) receiving second information suitable for decoding the at least one tile, the second information includes a location of the at least one tile, the location indicating a position of the at least one tile in the video bit-stream and the first information and the second information are provided in a header of the at least one slice;
   (d) receiving a flag indication if the at least one tile is being used;
   (e) receiving a flag at an end of the at least one tile;
   (f) ignoring bits in the bit-stream until reading from pre-defined positions when receiving the flag; and
   (g) initializing a decoding process at a beginning of each of the at least one tile.

2. A decoder for decoding video comprising:
   an entropy decoding circuit configured to receive a bit-stream of a frame of the video that includes at least one slice and at least one tile, where each of the at least one slice is decoded independently of another one of the at least one slice and includes the at least one tile, wherein the at least one tile is a rectangular region of the frame and includes coding units used for the decoding arranged in a raster scan order;
   an additional entropy decoding circuit configured to receive and entropy decode:
      (i) first information indicating whether location information of the at least one tile is transmitted within the at least one slice,
      (ii) second information suitable for decoding the at least one tile, where the second information includes a location of the at least one tile, the location indicating a position of the at least one tile in the video bit-stream and the first information and the second information being provided in a header of the at least one slice,
      (iii) a flag at an end of the at least one tile, and
      (iv) a flag indicating if the at least one tile is being used; and
   an inverse circuit configured to generate a residual signal using the bit-stream; wherein
   the entropy decoding circuit ignores bits in the bit-stream until reading from pre-defined positions when receiving the flag at an end of the at least one tile and initializes a decoding process at a beginning of each of the at least one tile.

* * * * *